US005605105A

United States Patent [19]
Clark et al.

[11] Patent Number: 5,605,105
[45] Date of Patent: Feb. 25, 1997

[54] METHOD AND APPARATUS FOR PLACING DRY OR LIQUID MATERIALS INTO THE SOIL SUBSURFACE WITHOUT TILLAGE TOOLS

[75] Inventors: Stanley R. Clark, Hesston; Mark R. Stelter, Lindsborg, both of Kans.

[73] Assignee: Great Plains Manufacturing, Incorporated, Assaria, Kans.

[21] Appl. No.: 323,786

[22] Filed: Oct. 17, 1994

[51] Int. Cl.$^6$ .................................................. A01C 23/00
[52] U.S. Cl. ......................... 111/127; 111/7.4; 111/120; 111/901; 111/903; 364/424.07
[58] Field of Search ........................... 111/118, 119, 120, 111/7.4, 127, 129, 901, 902, 903; 172/21, 22; 239/433, 428.5, 434.5, 429; 364/172, 174, 175, 424.07; 51/439, 436; 222/617–619

[56]  References Cited

U.S. PATENT DOCUMENTS

| | | |
|---|---|---|
| Re. 25,307 | 12/1962 | Johnston . |
| D. 269,784 | 7/1983 | Stark . |
| D. 325,739 | 4/1992 | Hinklin et al. . |
| 1,627,422 | 5/1927 | Wike . |
| 2,262,546 | 11/1941 | Donoho et al. . |
| 2,264,914 | 12/1941 | L'Orange . |
| 2,314,035 | 3/1943 | Dontje . |
| 2,341,859 | 2/1944 | Edwards . |
| 2,422,729 | 6/1947 | Helbig . |

(List continued on next page.)

FOREIGN PATENT DOCUMENTS

| | | | |
|---|---|---|---|
| 343938 | 2/1986 | Germany . | |
| 328859 | 8/1971 | U.S.S.R. . | |
| 438384 | 8/1974 | U.S.S.R. | 111/127 |
| 660614 | 5/1979 | U.S.S.R. | 111/127 |
| 843819 | 7/1981 | U.S.S.R. | 111/127 |
| 1136771 | 12/1968 | United Kingdom | 111/127 |
| 2164231 | 3/1986 | United Kingdom . | |

OTHER PUBLICATIONS

ILI, LTD—Envirojet Turf Grass Injection Brochure.
Cross Equipment Company, Inc.—Cross HIP 2000 Brochure Landscape Guide Management, Apr. 1988 article entitled "Warm–Season Insect Control Guide".
Golf Course Management, Nov., 1989 article entitled "High–Pressure Injection for White Grub Control" by Patricia J. Vittum.
Rogers Innovative Inc.—Root Zone "Pulse" Injector Brochure.

*Primary Examiner*—Terry Lee Melius
*Assistant Examiner*—Victor Batson
*Attorney, Agent, or Firm*—Hovey, Williams, Timmons & Collins

[57]  ABSTRACT

In order to place dry granular materials into the subsurface of the soil without mechanical tillage, minute charges of the material are carried by high pressure jets of liquid, such as water, down into the ground from a series of side-by-side nozzles that simultaneously fire the jets toward the ground at regular intervals as the nozzles advance along a path of travel. Instead of passing through the water pump and the sensitive jet-producing nozzles, the granular materials remain separated from the water until the jets have issued from their nozzles and are passing through a ceramic mixing chamber in which a venturi is located. During the short pauses between successive blasts from the nozzles, material is continuously fed into a collecting chamber for each nozzle to form a small charge. As the water blast takes place, the charge is automatically drawn into the venturi and carried out of the machine by the high pressure jet. A metering conveyor continuously delivers material to the collecting chambers at a speed that can be correlated with the speed with which the nozzles are moved along the application path, and the firings of the nozzles are likewise coordinated with the distance traversed by the nozzles along the path so that the concentration of materials applied per unit of area can be very precisely controlled. An onboard computer controls firing of the nozzles in relation to speed, distance and desired application rate, as well as other variables, and an optional embodiment provides a similar degree of control and precision for liquid additive materials.

33 Claims, 16 Drawing Sheets

U.S. PATENT DOCUMENTS

| | | | |
|---|---|---|---|
| 2,784,530 | 3/1957 | Dugan | 111/129 |
| 2,843,067 | 7/1958 | Dugan | 111/129 |
| 2,876,013 | 3/1959 | Neff . | |
| 2,905,117 | 9/1959 | Dugan | 111/129 |
| 2,930,334 | 3/1960 | Marron et al. . | |
| 2,988,025 | 6/1961 | Johnston . | |
| 3,012,526 | 12/1961 | Baldwin et al. . | |
| 3,029,756 | 4/1962 | Krivda . | |
| 3,136,274 | 6/1964 | Townsend . | |
| 3,160,123 | 12/1964 | Roquemore . | |
| 3,252,249 | 5/1966 | Propst . | |
| 3,295,480 | 1/1967 | Haynes . | |
| 3,361,354 | 1/1968 | Johnston . | |
| 3,361,357 | 1/1968 | Johnston . | |
| 3,409,033 | 11/1968 | Johnston . | |
| 3,435,785 | 4/1969 | Harbolt . | |
| 3,508,709 | 4/1970 | Small et al. . | |
| 3,518,953 | 7/1970 | Johnston . | |
| 3,521,819 | 7/1970 | Johnston . | |
| 3,533,366 | 10/1970 | Francom . | |
| 3,538,867 | 11/1970 | Every . | |
| 3,598,323 | 8/1971 | Johnston . | |
| 3,653,330 | 4/1972 | Yard . | |
| 3,653,550 | 4/1972 | Williams | 111/127 X |
| 3,709,436 | 1/1973 | Foster . | |
| 3,786,890 | 1/1974 | Shank . | |
| 3,815,525 | 6/1974 | Kainson et al. . | |
| 3,875,876 | 4/1975 | Pustovoit et al. . | |
| 3,877,643 | 4/1975 | Smith et al. . | |
| 3,883,075 | 5/1975 | Edney . | |
| 3,905,552 | 9/1975 | Hall et al. . | |
| 3,926,131 | 12/1975 | Collins . | |
| 4,009,666 | 3/1977 | Russell et al. . | |
| 4,034,686 | 7/1977 | Collins . | |
| 4,074,858 | 2/1978 | Burns et al. . | |
| 4,077,569 | 3/1978 | Deines . | |
| 4,100,610 | 7/1978 | Johnston et al. . | |
| 4,162,763 | 7/1979 | Higgins . | |
| 4,182,247 | 1/1980 | Talbott . | |
| 4,186,671 | 2/1980 | Huang . | |
| 4,193,550 | 3/1980 | Juttelstad et al. | 239/314 |
| 4,218,855 | 8/1980 | Wemmer | 51/439 |
| 4,231,283 | 11/1980 | Malburg . | |
| 4,233,915 | 11/1980 | Korden . | |
| 4,267,782 | 5/1981 | Talbott . | |
| 4,270,471 | 6/1981 | Talbott . | |
| 4,284,243 | 8/1981 | Shaner . | |
| 4,392,611 | 7/1983 | Bachman et al. . | |
| 4,429,647 | 2/1984 | Zinck . | |
| 4,449,332 | 5/1984 | Griffiths | 51/439 |
| 4,481,894 | 11/1984 | Brenn . | |
| 4,523,280 | 6/1985 | Bachman . | |
| 4,545,157 | 10/1985 | Saurwein | 51/439 |
| 4,570,553 | 2/1986 | Ito . | |
| 4,624,193 | 11/1986 | Johnston . | |
| 4,666,083 | 5/1987 | Yie | 239/8 |
| 4,708,058 | 11/1987 | Smith . | |
| 4,805,088 | 2/1989 | Cross et al. . | |
| 4,807,544 | 2/1989 | Cross et al. | 111/127 |
| 4,907,515 | 3/1990 | Win . | |
| 4,907,516 | 3/1990 | Rogers . | |
| 4,945,688 | 8/1990 | Yie | 51/439 |
| 4,970,973 | 11/1990 | Lyle et al. . | |
| 4,995,202 | 2/1991 | Gardner et al. | 51/439 |
| 5,018,670 | 5/1991 | Chalmers | 239/433 |
| 5,101,745 | 4/1992 | Podevels et al. . | |
| 5,119,744 | 6/1992 | Comer . | |
| 5,207,168 | 5/1993 | Comer . | |
| 5,291,842 | 3/1994 | Sallstrom et al. | 111/127 |
| 5,303,663 | 4/1994 | Salestrom | 111/118 X |
| 5,323,721 | 6/1994 | Tofte et al. | 111/903 X |
| 5,370,069 | 12/1994 | Monroe | 172/21 X |
| 5,407,134 | 4/1995 | Thompson et al. | 111/118 X |

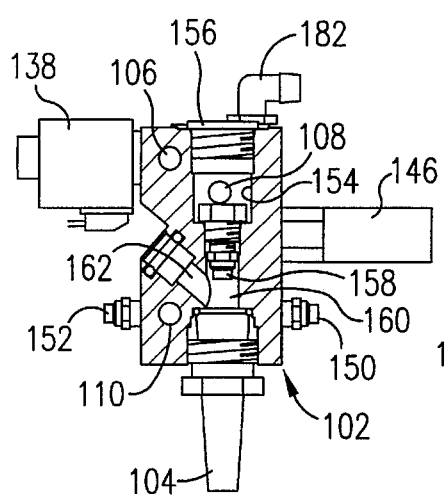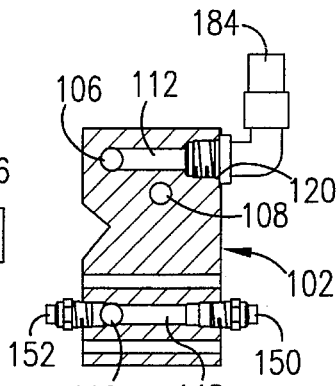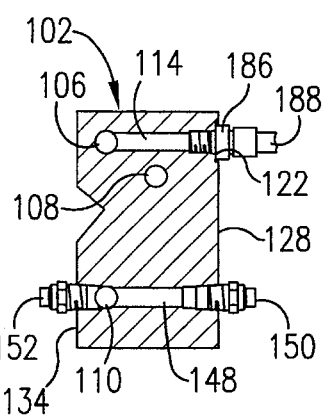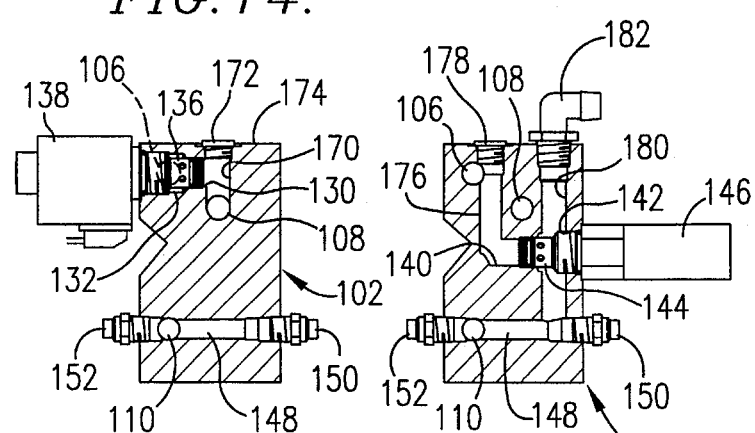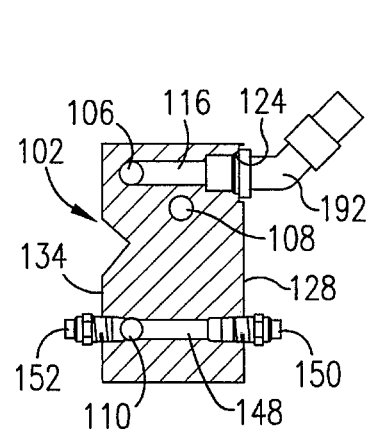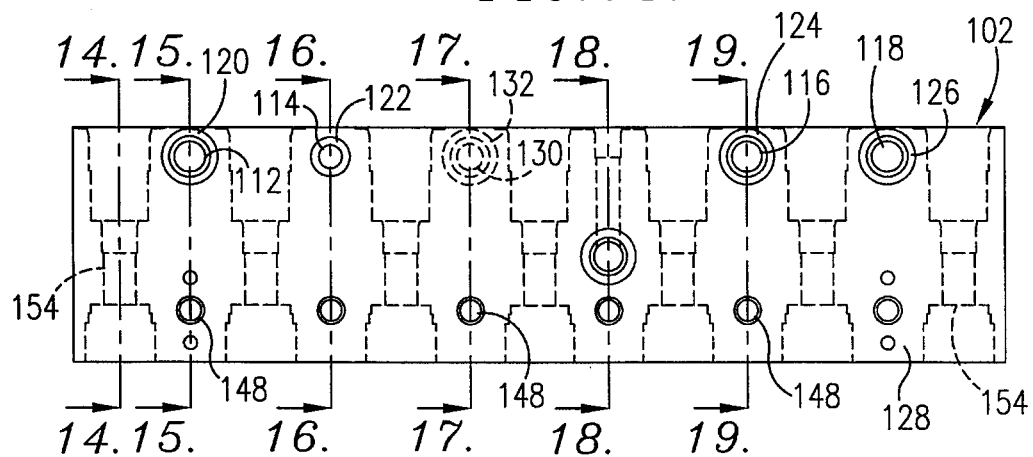

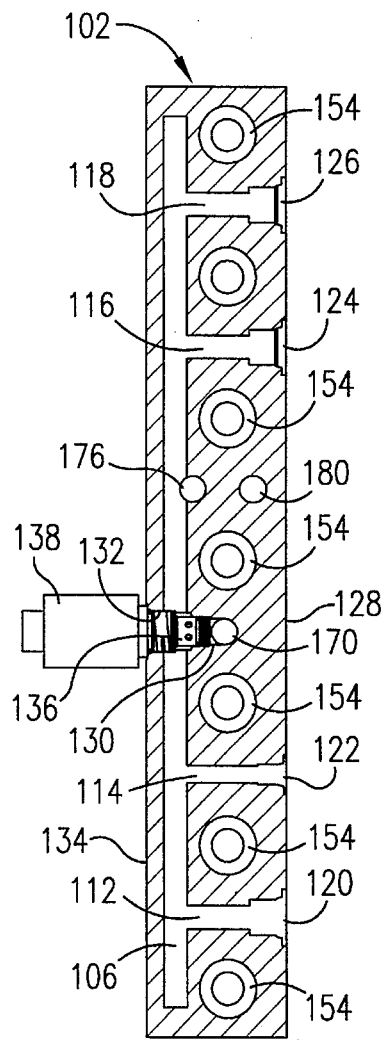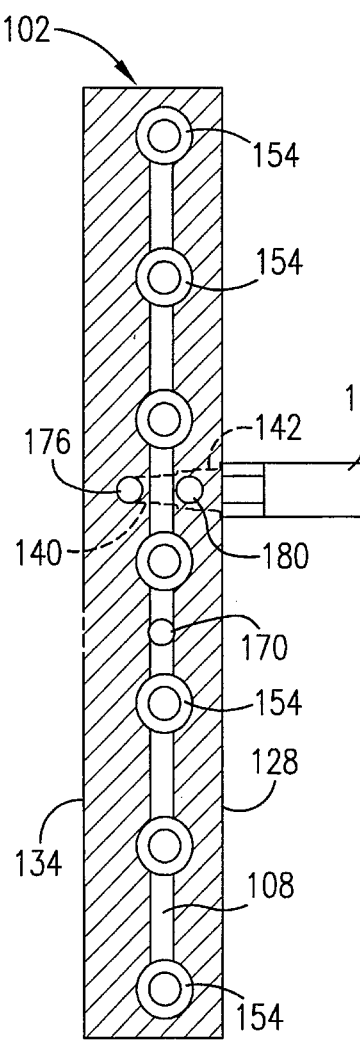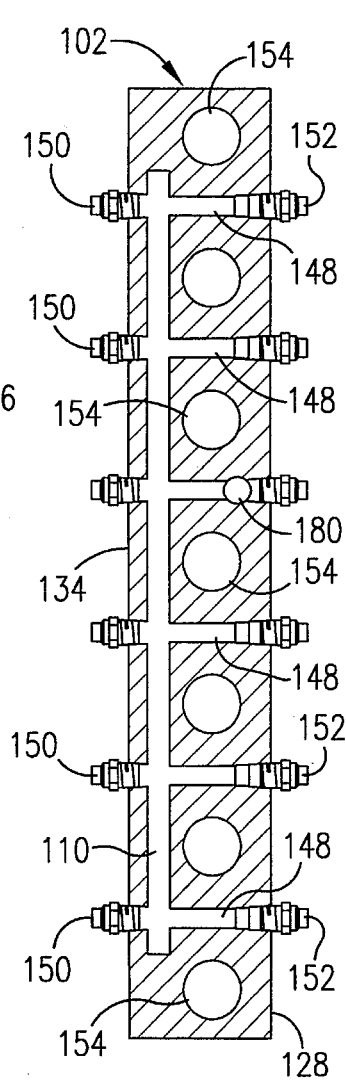
*FIG.21.* *FIG.22.* *FIG.23.*
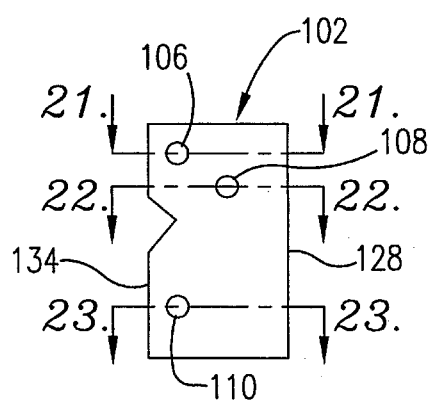
*FIG.20.*

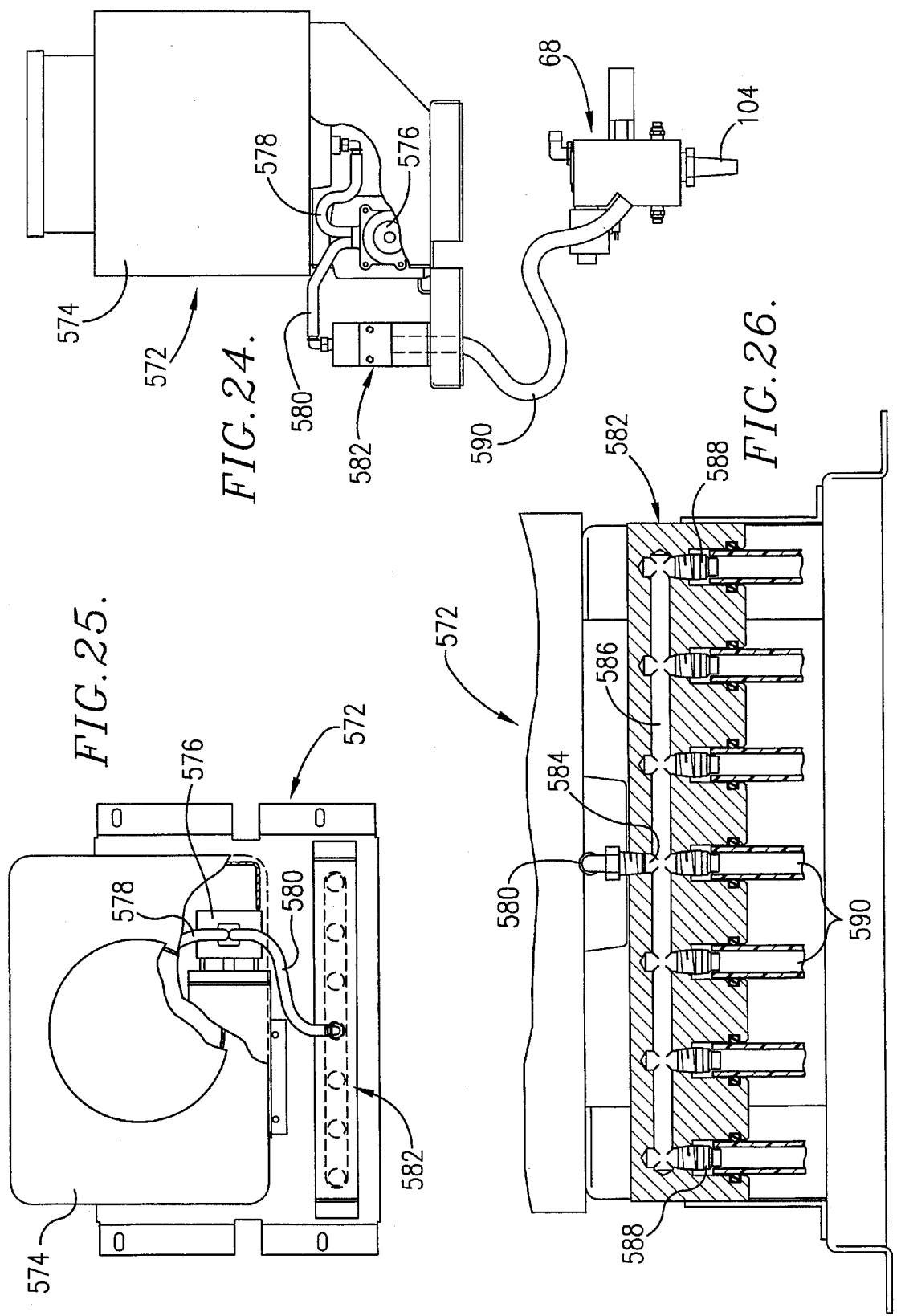

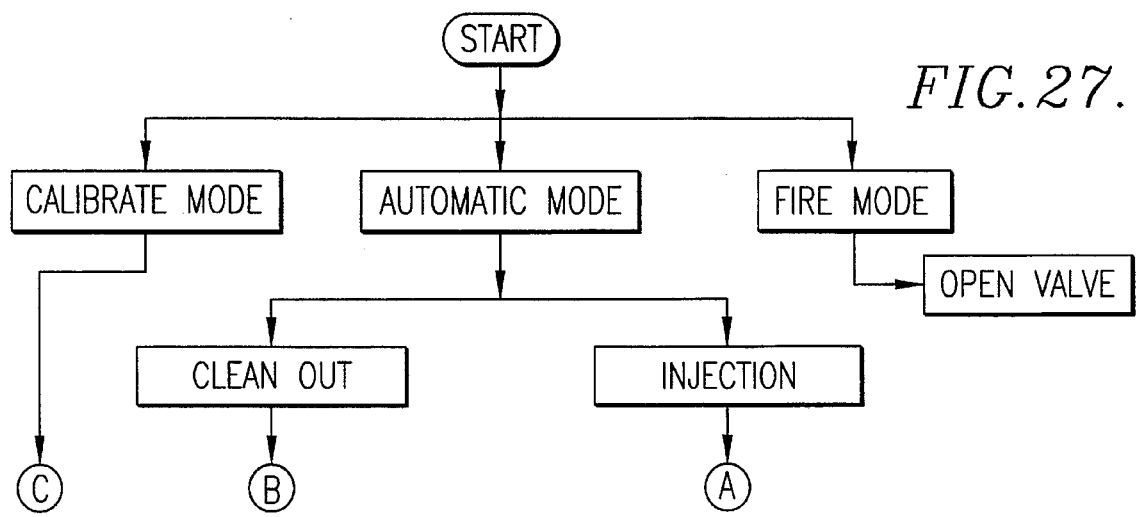
FIG. 27.
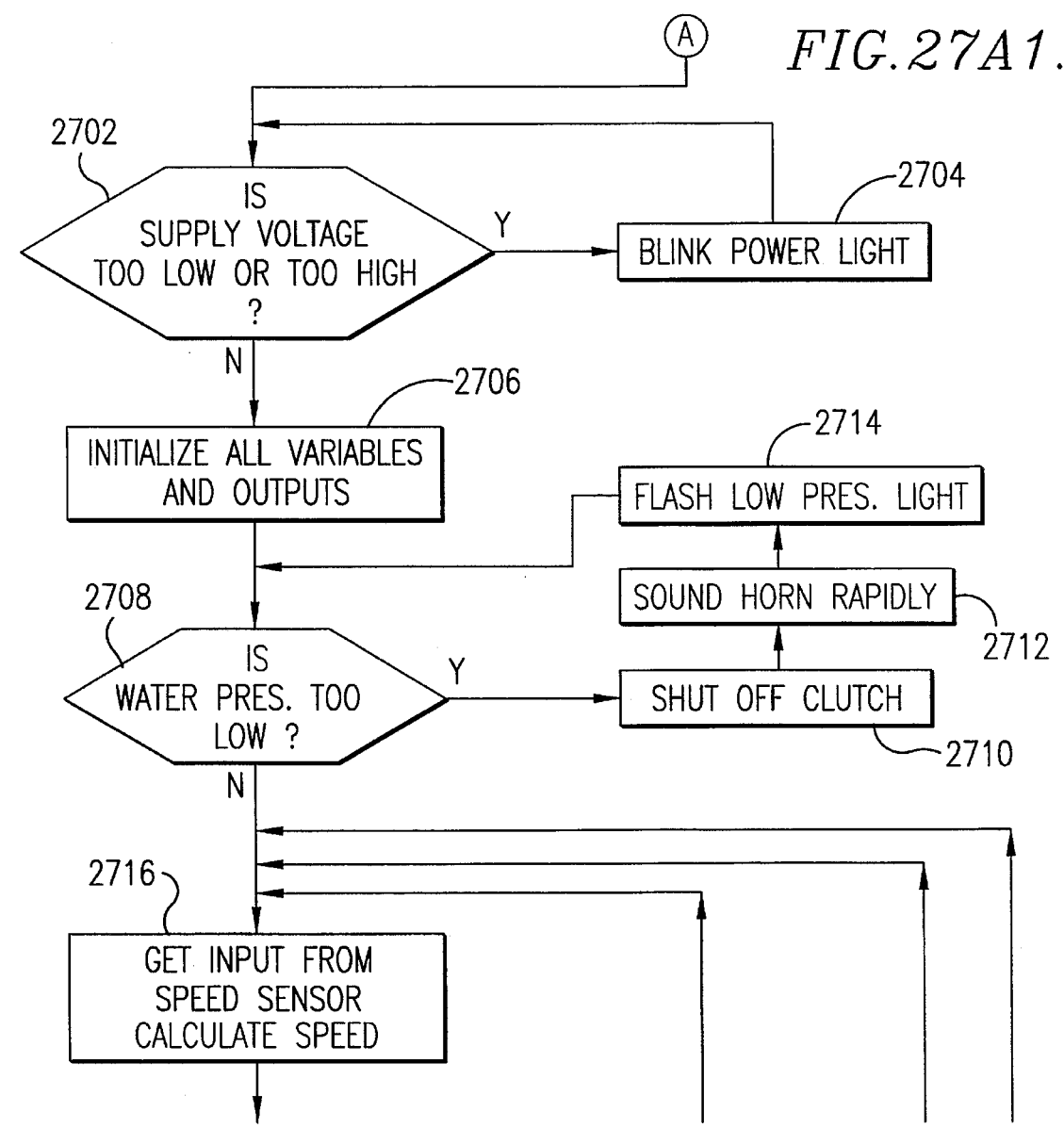
FIG. 27A1.

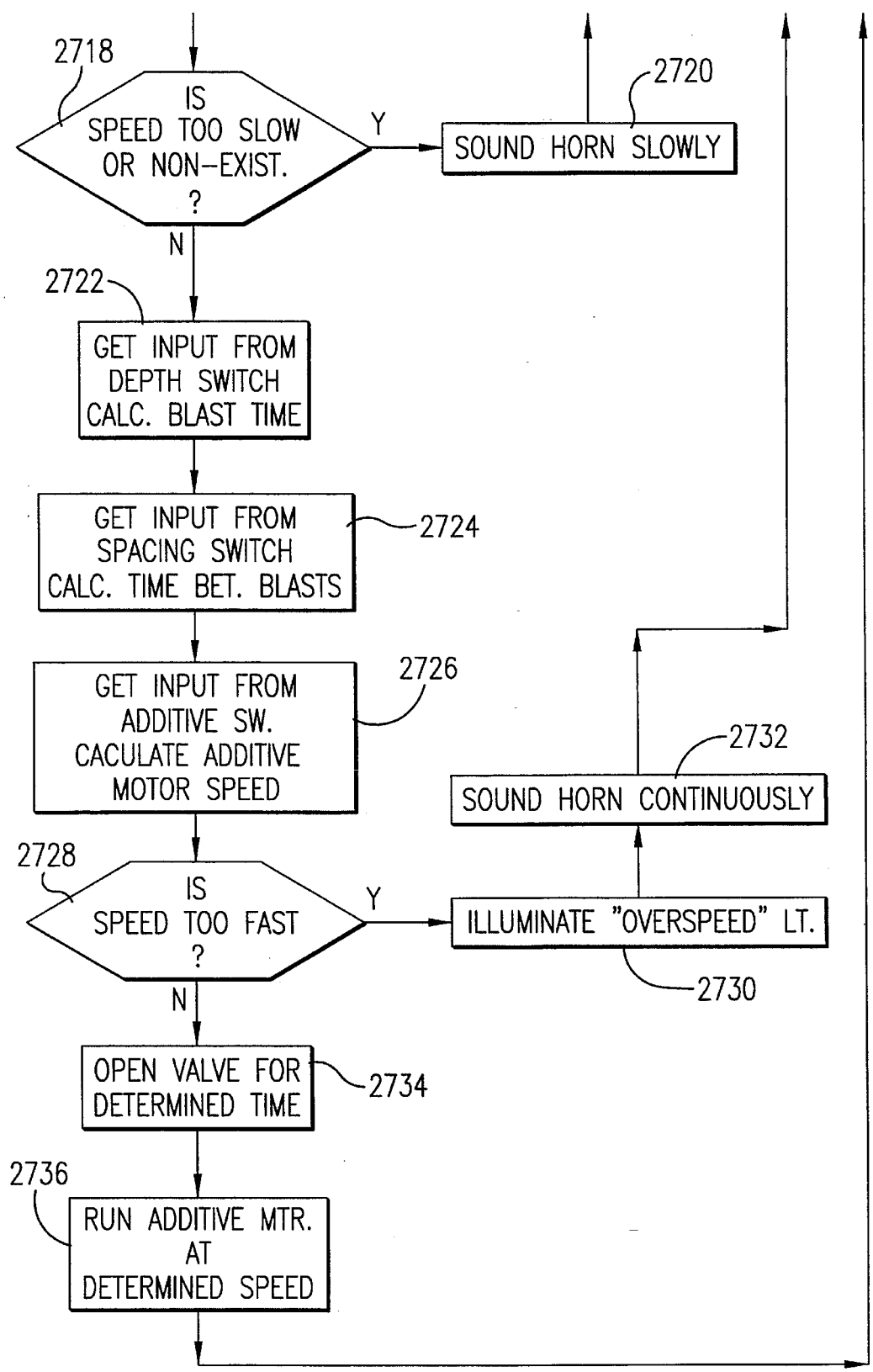
FIG.27A2.

5,605,105

METHOD AND APPARATUS FOR PLACING DRY OR LIQUID MATERIALS INTO THE SOIL SUBSURFACE WITHOUT TILLAGE TOOLS

TECHNICAL FIELD

The present invention relates to the field of turf maintenance equipment and, more particularly, to equipment for placing granular or liquid substances below the surface of the ground without using tillage tools that mechanically disrupt and disturb the ground surface as they work. The invention is particularly adapted for golf course and landscape maintenance operations, although it is not limited to such uses.

BACKGROUND

Conventionally, farmers and turf maintenance people have, for the most part, incorporated substances such as fertilizers, insecticides and polymers into the soil using tillage tools that mechanically cut through the ground and release the additive products at a point below the top surface of the ground. Surface treatment may also be carried out by either spraying liquid chemicals onto the top surface of the ground or spreading dry materials on the surface without making efforts to incorporate them deeper into the soil.

However, using tillage tools to plow through the soil in order to deliver the substances to the subsurface causes significant soil eruption and surface disturbance, as well making substantial openings in the ground. This is obviously unacceptable on homeowner lawns, golf greens, tee boxes and other areas of golf courses because it prevents recreational use of such areas for a significant amount of time following such procedures. Top surface application of chemicals runs the risk of environmental impairment due to run off and air-borne contamination.

While a significant amount of technology currently exists for placing liquid substances into the subsurface using high pressure water jets that cut through the soil and carry the substance down to the desired depth, very little successful work has been done in the placement of dry, granular materials without using mechanical tillage devices. Although various attempts have been made to deliver the dry materials to the subsurface using high pressure liquid jets, such efforts have achieved only mixed results at best.

One reason for this apparent lack of success is the fact that many granular materials, when mixed with water, become highly corrosive and injurious to the mechanisms used to apply them. Furthermore, granular materials are inherently abrasive so as to produce untoward wear in mechanical components if not properly handled.

Moreover, dry, granular materials are difficult to meter accurately unless the metering mechanism is kept in a moisture-free environment. Even then, a metering mechanism which is sensitive enough to allow minute adjustments in the application rate of granular additives is difficult to obtain.

SUMMARY OF THE INVENTION

Accordingly, one important object of the present invention is to provide a successful, commercially acceptable method and apparatus for placing dry, granular materials below the surface of the ground without tillage tools.

Another important object of the present invention is to provide a subsurface application method and apparatus that is especially, although not exclusively, well-suited for golf greens and other sensitive turf maintenance areas due to the lack of surface disruption resulting from the present invention. Furthermore, an important object of this invention is to provide a placement method and apparatus that can successfully handle liquid substances, as well as dry.

In carrying out the foregoing and other important objects, the present invention contemplates moving along the ground at some velocity, periodically firing jets of carrier liquid, such as water, toward the ground while the movement is ongoing, and introducing a charge of additive substance into the discharging jet during each blast so that the additive is entrained in the jet and carried with it down into the soil. Preferably, the introduction of each additive charge into the jet is achieved by using the rapidly moving jet to induce a simultaneous secondary airstream that draws the charge into the jet.

In the case of a dry additive, the charge of material for each nozzle is precisely metered to the nozzle using a conveyor belt that continuously feeds a steady stream of material into a small collecting chamber beside the nozzle. During the interval between successive blasts of liquid, a small volume of the material accumulates in the collecting chamber to comprise a charge for the next blast. When the blast then occurs, the accumulated charge is drawn into the mixing chamber and propelled down into the soil with the jet.

The metering function is carried out with precision and accuracy. Instead of metering the material by repeatedly opening and closing a discharge orifice with a shuttle plate or other type of valve, the present invention uses the constantly moving conveyor to deliver a continuous stream of the material to the temporary collecting chamber. By changing the rate of delivery of the conveyor, the size of the charge can be changed. In order to maintain a selected application rate or concentration of additive over a unit of surface area, the speed of the conveyor is continuously correlated with and adjusted according to the distance traversed by the machine and its speed of travel. In the event the machine slows down, so does the metering belt. If the machine speeds up, the metering belt correspondingly moves faster so that precisely the same size charge is presented to the jet for each blast. This is important since the frequency of the blasts along the path of travel depends upon how quickly the machine traverses the selected distance between successive slots, rather than upon a selected period of time. If the machine slows down, the blasts will occur less frequently in a time sense, but the ground distance between successive blasts and between the slots resulting therefrom will remain the same. Correspondingly, if the machine speeds up, the blasts will occur more frequently, but the distance between the blasts always remains the same, i.e., that which has been selected by the operator.

A programmable, on-board computer coordinates and controls the various functions of the machine. In the case of a liquid additive, the metering conveyor belt is replaced by a liquid metering pump.

BRIEF DESCRIPTION OF THE DRAWINGS

FIG. 11 is a top plan view of the manifold of the injection head of the machine illustrating also the cleaning nozzles and ground engaging rollers for the machine;

FIG. 13 is a side elevational view of the manifold block of the injection head;

FIG. 14 is a vertical cross-sectional view of the injection head taken substantially along line 14—14 of FIG. 13;

FIG. 15 is a vertical cross-sectional view of the injection head taken substantially along line 15—15 of FIG. 13;

FIG. 16 is a vertical cross-sectional view of the injection head taken substantially along line 16—16 of FIG. 13

FIG. 17 is a vertical cross-sectional view of the injection head taken along the line of 17—17 of FIG. 13;

FIG. 18 is a vertical cross-sectional view of the injection head taken substantially along line 18—18 of FIG. 13;

FIG. 19 is a vertical cross-sectional view of the injection head taken substantially along the line 19—19 of FIG. 13;

FIG. 20 is an end elevational view of the manifold block;

FIG. 21 is a horizontal cross sectional view of the manifold block taken substantially along the line of 21—21 of FIG. 20;

FIG. 22 is a horizontal cross-sectional view taken substantially along line 22—22 of FIG. 20;

FIG. 23. is a horizontal cross-sectional view of the manifold block taken substantially along line 23—23 of FIG. 20;

FIG. 24. Is a fragmentary, side elevational view of an alternative embodiment for supplying additive material in liquid form to the injection head of the machine;

FIG. 25 is a fragmentary top plan view thereof;

FIG. 26 is an enlarged, fragmentary, vertical cross-sectional view of the liquid supply embodiment of FIGS. 24–25.

FIGS. 27, 27A1, 27A2, 27B and 27C comprise a flow chart illustrating steps followed by the control system of the machine during operation;

DETAILED DESCRIPTION

In the description which follows, the placement method and apparatus will be described in connection with a machine which uses water as the carrier liquid for injecting additive substances into the soil. However, it is to be understood that the liquid fired into the soil does not need to be water and that many other types of liquids could be used. Furthermore, although the machine is illustrated for connection to a water spigot as the source of supply, the machine could also carry its own supply tank of water or other liquid.

Figure 1:
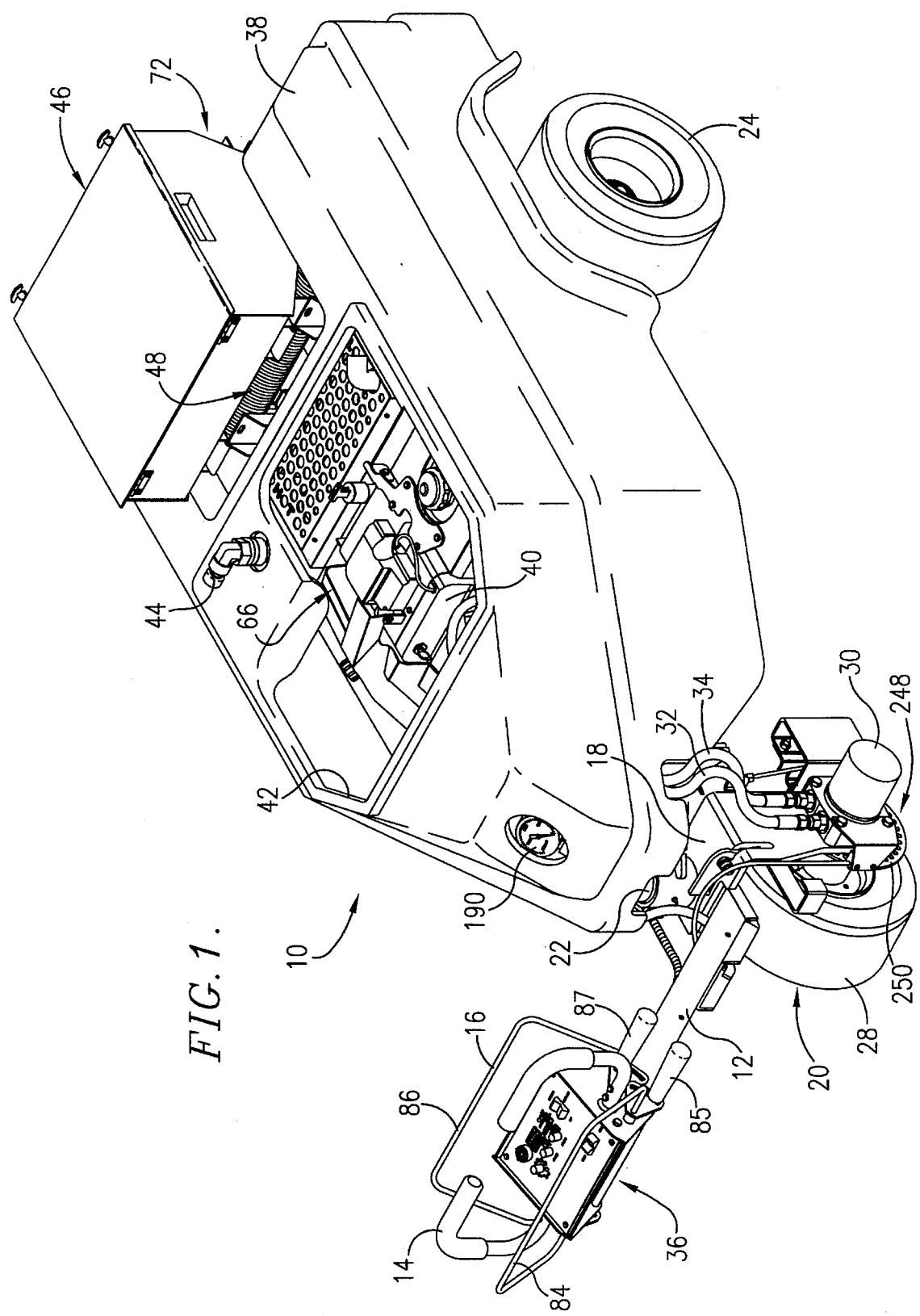
FIG. 1 is an isometric view of a machine constructed in accordance with the principles of the present invention and capable of carrying out our novel method, this particular view of the machine showing the outer housing or shielding in place, while all other views hereinafter described show the machine without such housing.

With reference to FIG. 1, it will also be seen that the method and apparatus of the present invention are embodied in a self-propelled machine 10. However, other pull-type, push-type or tractor-mounted embodiments might also be employed without departing from the principles of the present invention.

The machine 10 is designed to permit the operator to walk along with the machine and control its operation. Because the machine is reversible, the operator either trails the machine or leads the machine, depending upon its direction of travel. In this regard, it will be seen that the machine 10 is provided with a steerable tongue 12 having a pair of rigidly interconnected speed control handles 14 and 16 at its upper end for grasping by the operator during use. The lower end of the tongue 12 is rigidly affixed to the upright yoke 18 of the single drive wheel assembly 20 of the machine, such assembly 20 being steerable by the operator about an upright pivot axis associated with a pivot shaft 22. The machine also has two additional left and right ground wheels 24 and 26 respectively (see FIG. 4) which are not driven and simply free-wheel as the machine is driven along the ground by the drive wheel assembly 20.

Figure 2:
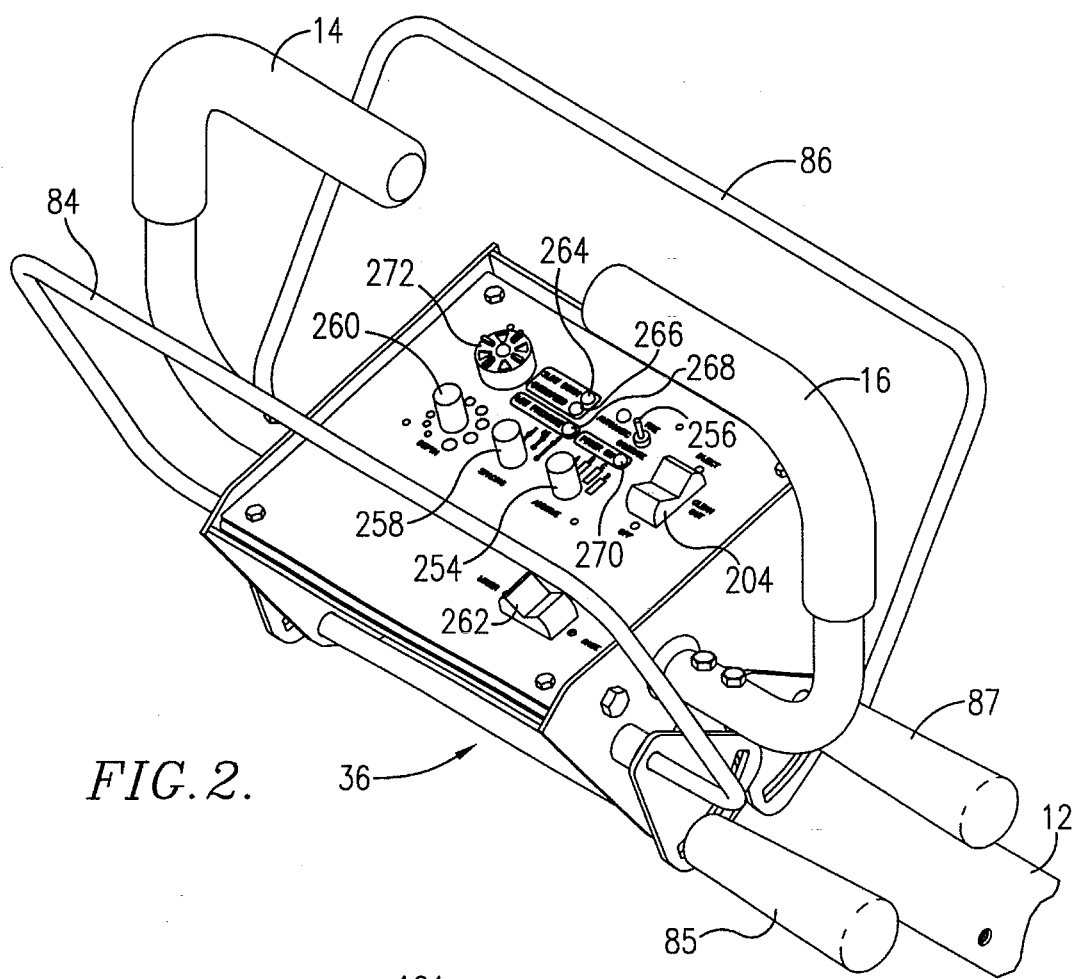
FIG. 2 is an enlarged, fragmentary isometric view of the control box of the machine.

The drive wheel assembly 20 includes a wheel 28 that is driven by a rotary hydraulic motor 30. Hydraulic lines 32 and 34 carry fluid to and away from the motor 30 during operation. The upper end of the tongue 12 supports a control box 36 which places the controls for the machine in a convenient location for the operator whether the machine is moving in forward or reverse. Further details of the control box 36 are shown in FIG. 2 and will be described in more detail hereinafter.

The machine 10 as depicted in FIG. 1 is provided with a stylized housing 38 that covers and shields most of the major components of the machine. Such housing 38 has been removed in the other drawing figures to reveal details of construction. With the housing 38 in place, however, certain of the components may still be seen, including, for example, the gasoline-powered engine 40 situated below a cut out 42 in the top wall of the housing 38, a water supply inlet fitting 44 which is connected to a water supply hose during use, a dry additive supply hopper 46, and the grooved metering belt 48 beneath the hopper 46 forming part of the metering mechanism for delivering a dry granular material to the discharge head of the machine. The gasoline engine may comprise a Kohler 11.5 h.p. engine.

Figure 3:
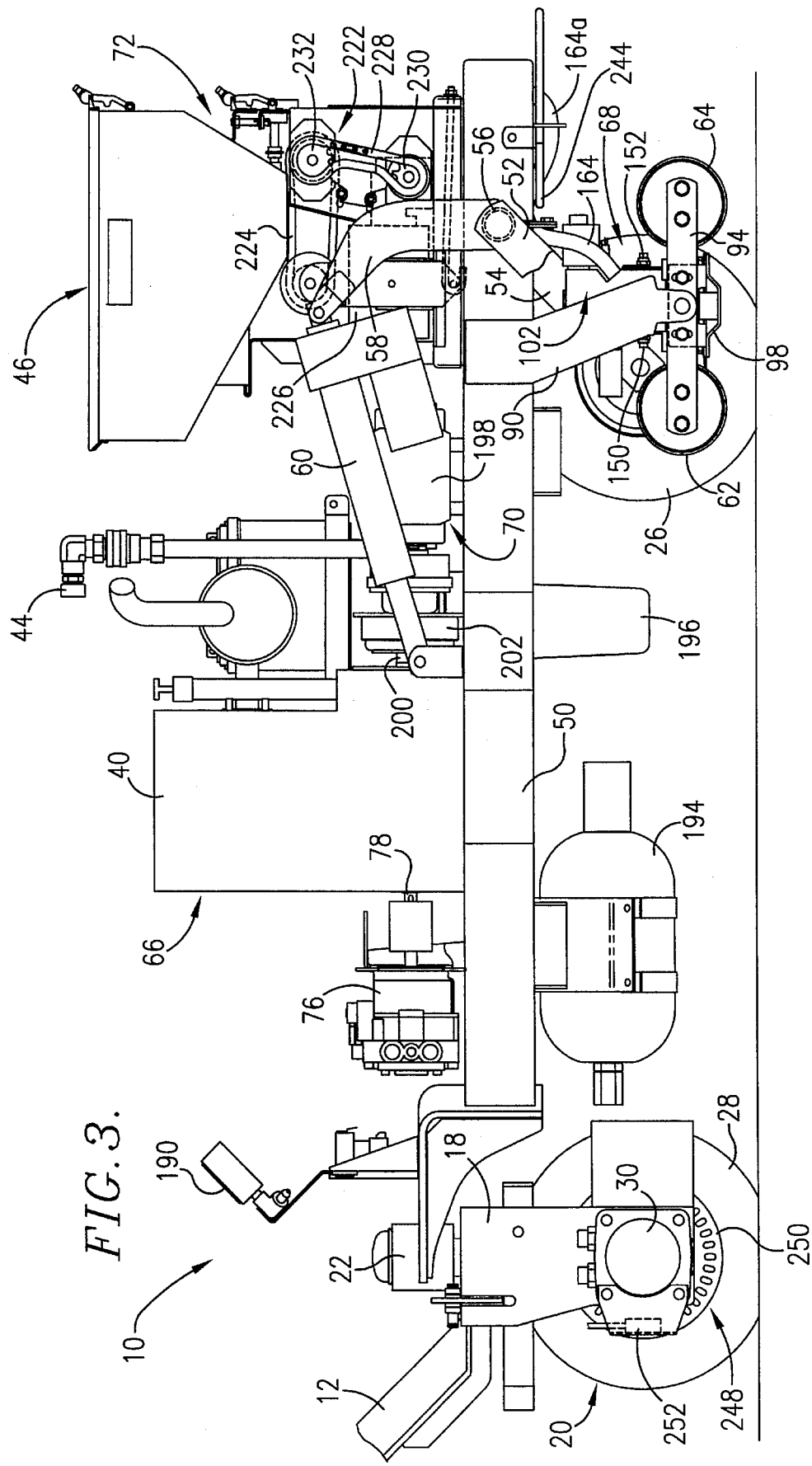
FIG. 3 is a fragmentary right side elevational view of the machine.
Figure 4:
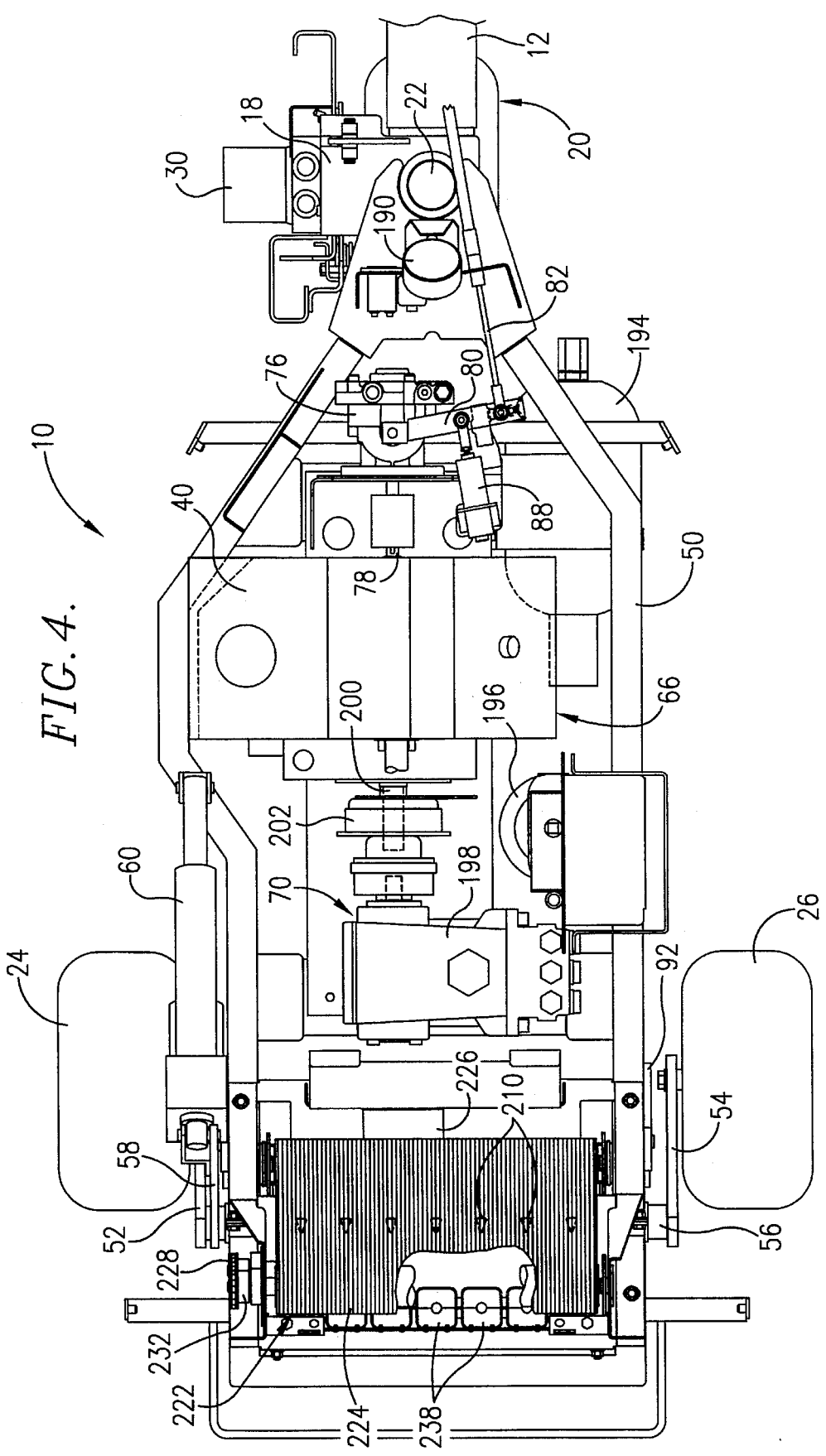
FIG. 4 is a top plan view of the machine facing in the opposite direction from FIG. 3 and with the granular material hopper removed to reveal details of construction, a portion of the metering conveyor being broken away to also reveal certain details.
Figure 5:
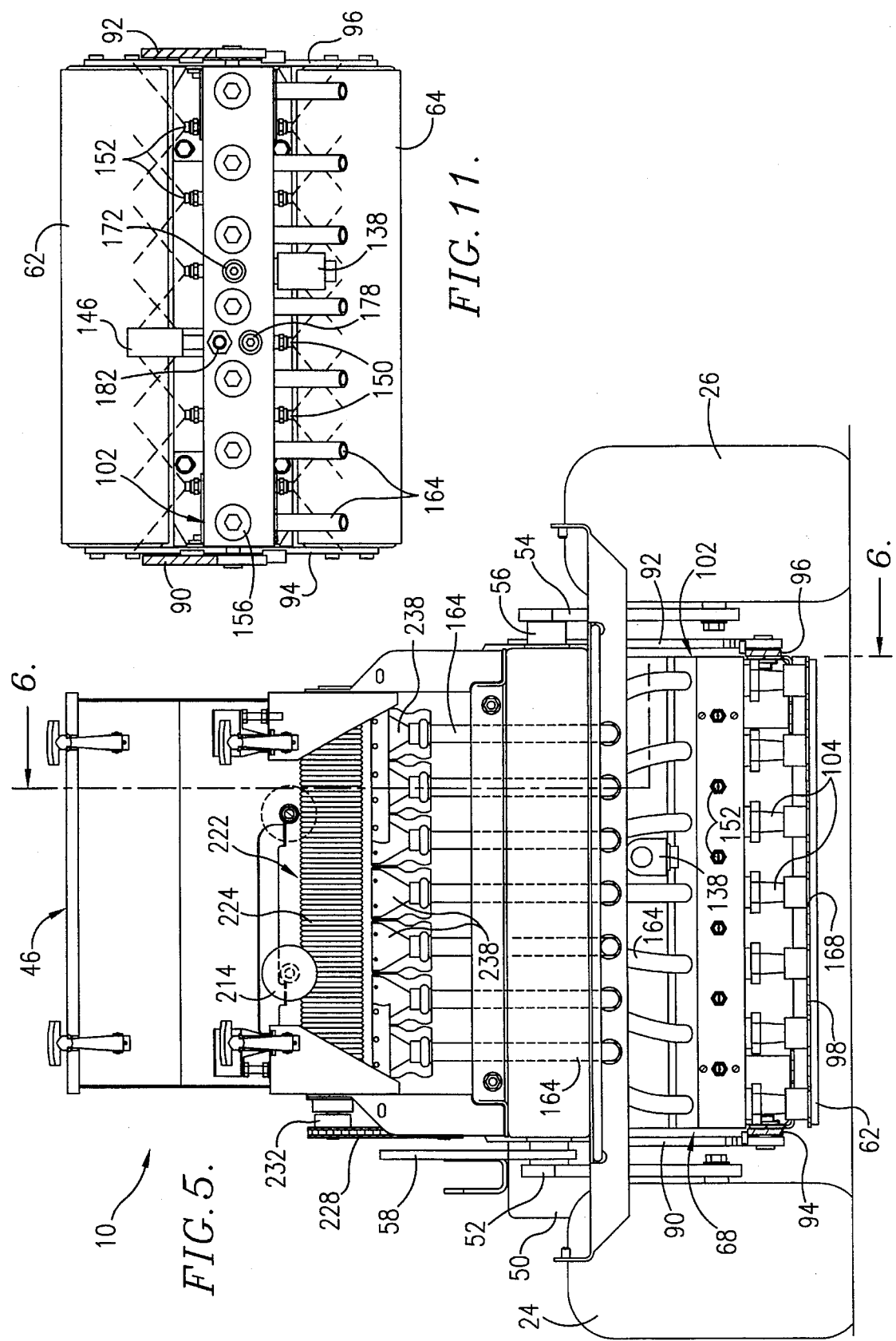
FIG. 5 is a front end elevational view of the machine illustrating in particular the granular hopper, metering conveyor and injection head.

As illustrated in particular in FIGS. 3, 4 and 5, the machine has a main support that includes a frame 50, the wheel assembly 20 and the supporting tongue 12. Frame 50, wheel assembly 20 and tongue 12 carry all of the components of the machine. The upright pivot shaft 22 for the drive wheel assembly 20 is located at the rear of the frame 50 while the ground wheels 24 and 26 are located adjacent the front of frame 50 on opposite sides thereof.

Ground wheels 24 and 26 are respectively carried at the lower ends of a pair of wheel arms 52 and 54 that are fixed at their upper ends to a common transverse rock shaft 56 journaled by the frame 50. The rock shaft 56 has an upstanding lever 58 fixed thereto and coupled at its upper end with a hydraulically powered actuator 60 for swinging the lever 58 fore-and-aft. Such motion of the lever 58 has the effect of rotating the rock shaft 56 about its longitudinal axis, whereby to raise and lower the ground wheels 24, 26 relative to the frame 50. Such raising and lowering is only for a relatively short distance sufficient to enable a pair of spaced apart, transversely disposed pressing rollers 62 and 64 to engage the ground when the wheels 24, 26 are raised relative to the frame 50 and to become elevated off the ground when the wheels 24, 26 are lowered relative to the frame 50.

Figure 28:
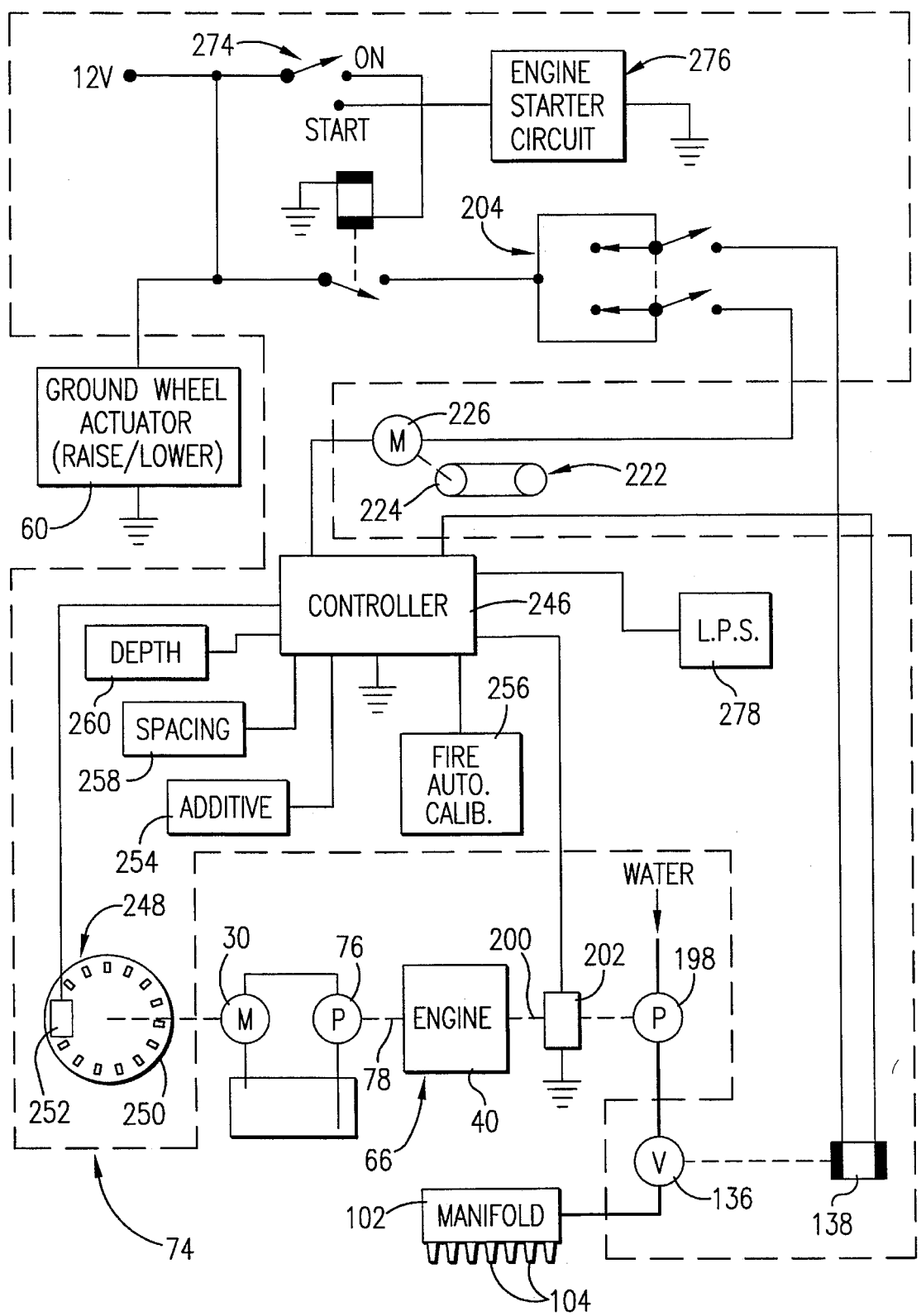
FIG. 28 is a schematic diagram of the various operating and control systems of the machine.

The support of the machine 10 carries five major systems which make up the operating components of the machine. These five systems include the propelling system broadly denoted by the numeral 66, the injection head broadly denoted by the numeral 68, the water supply system broadly denoted by the numeral 70, the additive supply system broadly denoted by the numeral 72, and the control system broadly denoted by the numeral 74 (FIG. 28).

Dealing first with the propelling system 66, the rotary hydraulic motor 30 and hydraulic lines 32, 34 as previously described comprise a part of the propelling system 66. The engine 40 carried on frame 50 comprises another part. In addition, the engine 40 drives a variable displacement oil pump 76 via an output shaft 78 for the purpose of providing pressurized oil to the hydraulic motor 30 associated with the drive wheel assembly 20. The volume of oil displaced by the pump 76 is regulated by an internal swash plate as well understood by those skilled in the art, the position of which is determined by an operating lever 80 (FIG. 4) connected to a control linkage 82 that leads to the handles 14, 16 at the control box 36 on the tongue 12. The hydraulic pump 76 may comprise a Sunstrand BDP model with a fixed displacement motor.

The handles 14, 16 are connected together as a unit and may be rocked fore-and-aft to change the ground speed of the machine. Bail-like stops 84 and 86 for the speed control handles may be positioned to limit the extent of fore-and-aft swinging of the handles 14, 16. A pair of releasable retaining knobs may be used to hold the stops 84, 86 in selected positions of adjustment. A spring assembly 88 (FIG. 4) yieldably biases the lever 80 to a neutral position so that, even though engine 40 may be running, oil is not being pumped from the pump 76 to the rotary motor 30 unless the swash plate has been shifted by the control lever 80 out of its neutral position.

The injection head 68 is also carried on the frame 50 but is suspended below the latter and between the ground wheels 24, 26 by a pair of hanger brackets 90 and 92 on opposite sides of the machine. The brackets 90, 92 also respectively support a pair of fore-and-aft bars 94 and 96 on opposite sides of the machine that cooperate to rotatably support the pressing roller 62 and 64 on opposite, fore-and-aft sides of the injection head 68. A formed metal transverse skid plate or cover 98 spans the two bars, 94, 96 beneath the injection head 68 and is fixed to the bars 94, 96. As will be seen, the plate 98 protects outlet cones of the injection head 68 from damage through impact with obstacles during use. Upstanding brackets 100 (FIG. 12) form a part of a sub-frame defined by the hanger brackets 90, 92, the bars 94, 96 and the cover plate 98 and are bolted to the front and rear faces of the injection head 68 so as to fixedly secure head 68 to the hanger brackets 90, 92.

The most visible components of the injection head 68 comprise the block-like, transversely extending manifold 102 and a series of tubular discharge cones 104 that project downwardly from the bottom of the manifold 102. In the illustrated embodiment a total of seven cones 104 have been shown, but it will be understood that more or less cones may be utilized without departing from the principles of the present invention. Indeed, theoretically only a single cone may used, although this would apparently not be practical from a commercial standpoint.

Although the injection head 68 is illustrated in many of the drawing figures, FIGS. 12–23 may be referred to in particular for details of construction of the manifold 102. As shown in FIG. 20, the manifold block 102 is provided with three longitudinally extending, parallel cross-drill passages 106, 108 and 110 extending horizontally through the block 102 at different levels. Such passages 106, 108 and 110 are also illustrated in their entireties in FIGS. 21, 22 and 23, although in these latter Figures the passages 106, 108 and 110 have not been illustrated as extending entirely through the block from end-to-end and then closed at such opposite ends by suitable plugs as would be the case in commercial practice. The passage 106 is located at the highest level of the three passages, while the passage 108 is located a short distance below passage 106 in laterally spaced relation thereto, while the third passage 110 is located below the passage 108 in the same vertical plane as the passage 106.

At the level of the upper passage 106, the manifold block 102 is provided with four transverse passages 112, 114, 116 and 118 that intersect with the cross-drill passage 106 to communicate the same with the respective holes 120, 122, 124 and 126 in the rear face 128 of the manifold block 102 (See FIG. 21). In addition, at the level of the cross-drill passage 106, the manifold block 102 has a fifth transverse passage 130 near the center of the block 102 as illustrated in FIG. 21 which leads rearwardly from the cross-drill passage 106 to a point in a vertical alignment with the intermediate cross-drill passage 108. The passage 130 has an axially aligned bore 132 that extends forwardly across the cross-drill passage 106 and out the front face 134 of the manifold block 102. An axially reciprocal valve stem 136 (FIGS. 17 and 21) is slidably received within the bore 132 and is adapted to open and close communication between the cross-drill passage 106 and the passage 130, depending upon the axial position of the valve stem 136. An electrically actuatable solenoid 138 projects from the front face 134 of the manifold block 102 and is coupled with the valve stem 136 for extending and retracting the stem 136 between its open and closed positions. Valve stem 136 is shown in its closed position in FIGS. 17 and 21 so that the passage 130 is sealed off from the cross-drill passage 106. The solenoid 138 is designed to maintain the valve stem 136 normally open. Both the valve stem 136 and the solenoid 138 comprise part of the control system 74 as will be explained in more detail hereinafter. One type of solenoid and valve stem suitable for performing the function of the solenoid 138 and the valve stem 136 is a standard, poppet-type, preferably stainless steel valve which fits in a standard ⅞-14 port and is modified for viscosity.

At a level between the cross-drill passage 108 and cross-drill passage 110 the manifold block 102 is provided with a fore-and-aft extending passage 140 (FIGS. 18 and 22) and with a larger bore 142 aligned axially with the passage 140, leading rearwardly therefrom across the cross-drill passage 108, and extending to the rear face 128 of the manifold block 102. The reciprocal stem 144 (FIG. 18) of a high pressure relief valve 146 is slidably received within the bore 142 for maintaining the relief passage 140 closed unless the pressure within the cross-drill passage 106 exceeds a certain predetermined level. One type of suitable relief valve 146 is a standard poppet-type relief valve modified for viscosity, preferably made of stainless steel, which fits into a standard ⅞-14 port.

At the level of the cross-drill passage 110 the manifold block 102 is provided with six low pressure passages 148 that extend completely through the manifold block 102 and intersect the cross-drill passage 110 at spaced locations along the latter. Six washing nozzles 150 are threaded into the front face 134 of the manifold block 102 at the passages 148, while a second series of six washing nozzles 152 project from the opposite, rear face 128 of the block 102 at the opposite ends of the passages 148. The washing nozzles 150 and 152 are positioned to spray water on the respective rollers 62 and 64 during the operating cycle of the machine to keep such rollers free of mud and grass clippings.

Extending vertically completely through the manifold block 102 are seven nozzle passages 154 which are identical to one and other. All seven of the nozzle passages 154 intersect the intermediate cross-drill passage 108 as shown in FIG. 22 such that high pressure water supplied to the intermediate passage 108 is also communicated to the seven nozzle passages 154. A series of seven Allenhead plugs 156 are threaded into the upper ends of the seven nozzle passages 154 to close off the upper ends of the passages 154 during operation.

Figure 12:
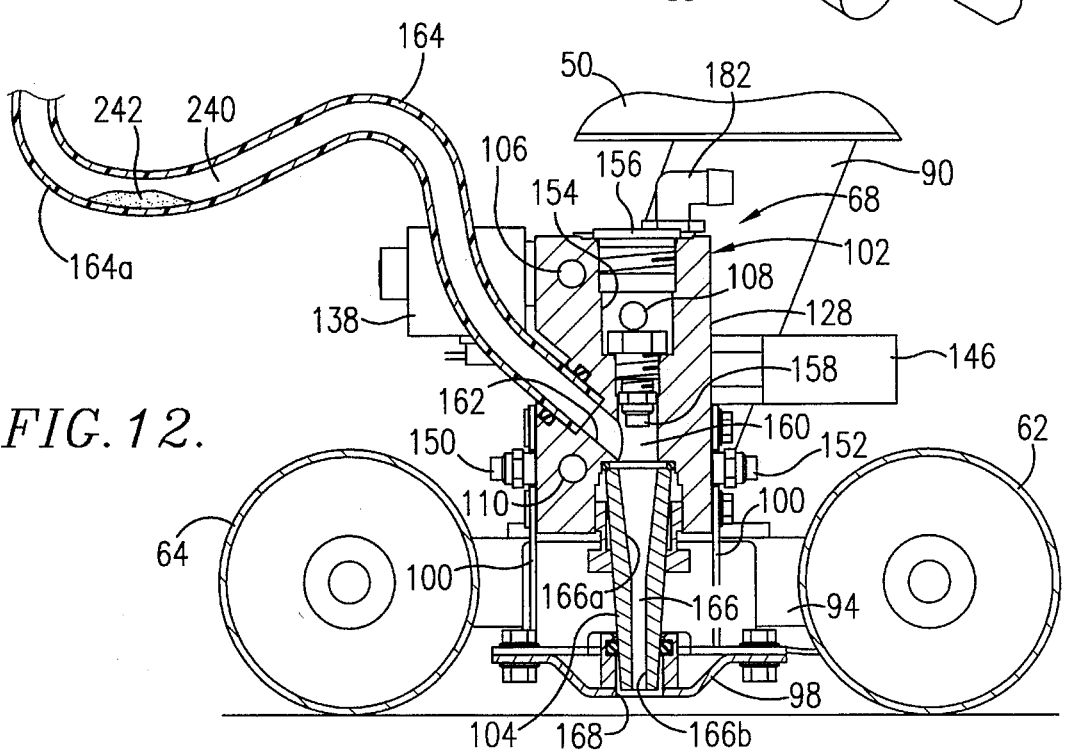
FIG. 12 is an enlarged vertical cross-sectional view of the discharge area of the machine showing the injection head lowered down into its operating position.

As illustrated in FIGS. 12 and 14, the nozzle passages 154 are each reduced in diameter over the length of a central portion thereof starting a short distance below the cross-drill passage 108. Within such reduced diameter portion of each nozzle passage 154 a high pressure nozzle 158 is threadably received for the purpose of producing a powerful high pressure jet of water when high pressure water is supplied thereto through the cross-drill passage 108. A mixing chamber 160 is defined immediately below the lower end of the nozzle 158 within each passage 154, which mixing chamber 160 then opens into a corresponding discharge cone 104. A suitable nozzle 158 is available from Spraying Systems Company of Wheaton, Ill. identified as a ¼ MEG 00045 stainless steel nozzle, which is a solid stream nozzle with a 0° spray angle and a circular orifice having a diameter of approximately 0.069 inches.

The mixing chamber 160 in each nozzle passage 154 is enlarged with respect to the restricted nozzle 154 immediately upstream therefrom so as to present a venturi in each passage 154 at the mixing chamber 160. Such venturi creates an area of negative pressure within the mixing chamber 160 so as to induce a secondary air stream into the mixing chamber 160 via an inclined supply passage 162 as illustrated in FIGS. 12 and 14. Each inclined supply passage 162 is, in turn, coupled with an additive supply hose 164 as shown, for example, in FIG. 12. The supply passages 162 and the hoses 164 comprise a portion of the additive supply system 72 to be described in greater detail below.

As illustrated in FIG. 12, each of the discharge cones 104 is tubular so as to present an internal passage 166. The upper portion 166a of each passage 166 tapers downwardly from an initial diameter substantially the same as that of the mixing chamber 160, while the lower portion 166b is cylindrical, having a diameter approximately ⅓ that of the mixing chamber 160. The cover plate 98 along the bottom of the injection head 68 has a series of seven holes 168 disposed in vertical registration with the lower ends of the cones 104 for the purpose of avoiding interference with the high pressure jets issuing from the cones 104. One type of suitable cone 104 is a DIAMONITE 1⅛ inch by 3/16 inch ceramic cone available from W. R. Grace of Shreve, Ohio.

As illustrated in FIGS. 17, 21 and 22, the manifold block 102 is also provided with a relatively short vertical passage 170 connecting the valve passage 130 with the intermediate cross-drill passage 108. Thus, when the solenoid valve 136 is open, the high pressure cross-drill passage 106 is communicated with the high pressure cross-drill passage 108 via the short horizontal passage 130 and the short vertical passage 170. When valve 136 is closed, such communication is prevented. As shown in FIG. 17, a small plug 172 is threaded into the upper end of the passage 170 through the top face 174 of the manifold block 102. Additionally, the manifold block 102 has a vertical, high pressure passage 176 as shown in FIGS. 18, 21 and 22 that communicates the high pressure cross-drill passage 106 with the relief passage 140 to permit the relief valve 144 to be in continuous communication with the pressurized water in the cross-drill passage 106. As shown in FIG. 18, a small plug 178 is threaded into the uppermost end of the passage 176 for the purpose of closing off the latter.

Further, the valve block 102 is provided with a vertical passage 180 as shown in FIGS. 18, 21, 22 and 23 for the purpose of providing relatively low pressure water to the washing nozzles 150 and 152. This is accomplished by having the passage 180 extend downwardly from the top surface 174 of the manifold block 102 until intersecting with the passage 148 of one set of the washing nozzles 150, 152 as illustrated in FIG. 23. An elbow inlet 182 threaded into the upper end of the passage 180 is adapted to be connected with the water supply system 70 so as to provide the relatively low pressure water for the washer nozzles 150 and 152. As illustrated in FIG. 18, the relief bore 142 and the passage 180 intersect one another at the relief valve stem 144 such that water within the passage 180 also has access to beveled operating surfaces on the valve stem 144. This enables the water within passage 180 to operate the relief valve stem 144 in the event pressure within the passage 180 becomes inordinately high.

As illustrated in FIG. 15, the high pressure transverse passage 112 is provided with an elbow fitting 184 threaded into the hole 120 in the rear face 128 of the manifold block 102. Such elbow fitting 184 is connected to the high pressure portion of the water supply system 70 as will be described below. As seen in FIG. 16, a straight fitting 186 is adapted to connect the transverse high pressure passage 114 with a conduit 188 that leads to a pressure meter 190 (FIGS. 1, 3, and 4) at the rear of the frame 50. It will be noted that the meter 190 is plumbed in parallel with the primary high pressure cross-drill passage 106 so as to provide an accurate reading of the pressure within the cross-drill passage 106 for the operator. As shown in FIG. 16, the straight fitting 186 is threaded into the hole 122 for passage 114 in the rear face 128 of the manifold block 102.

The transverse passage 106 is provided with an angled fitting 192 as shown in FIG. 19 which is connected with an accumulator 194 (FIG. 3, 4 for example) which also forms part of the high pressure supply portion of the water supply system 70. As will be seen, the accumulator 194 functions to maintain the water within the manifold block 102 at a selected high pressure level even during discharge when the pressure has a tendency to drop. One suitable accumulator 194 is a standard water service type, preferably Nickel-plated, four-quart bladder-type unit.

Figure 29:
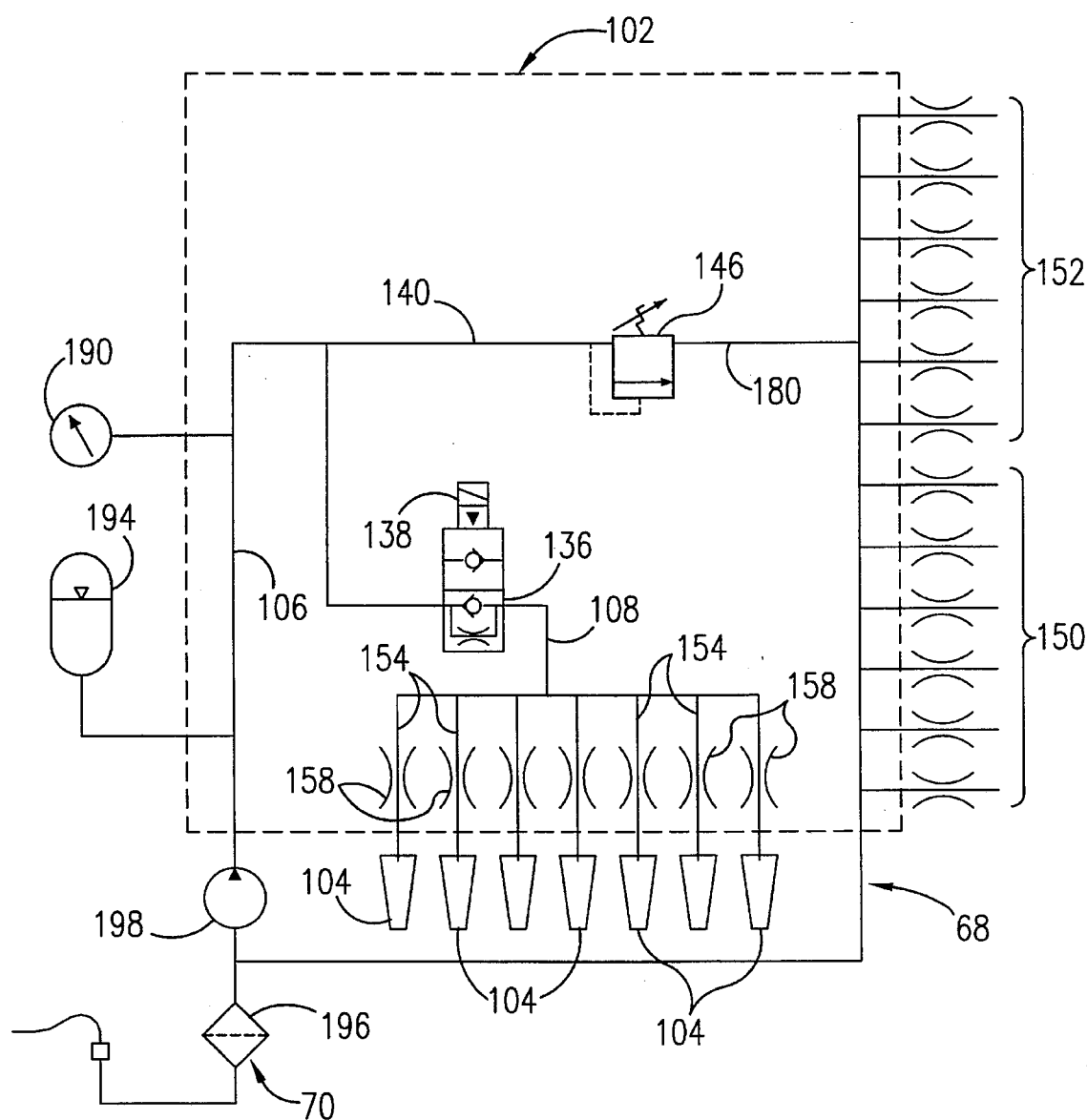
FIG. 29 is a schematic diagram of the water supply system of the machine.

FIG. 29 schematically shows the relationship between components of the water supply system 70 and the discharge head 68. The incoming water first passes through a filter 196 before then traveling to a pump 198. The pump 198 may also be seen in FIGS. 3 and 4 and is mechanically driven by the engine 40 through an output shaft 200. An electric clutch 202 between the output shaft 200 and the pump 198 may be engaged and disengaged by the operator using a 3-position rocker switch 204 on the control box 36 (FIG. 2). When the clutch 202 is disengaged but water is being supplied to the machine at city pressure, no high pressure water is directed into the injection head 68, but water at city pressure does flow to the washing nozzles 150, 152. A suitable pump 198 is a triplex piston pump available from Cat Pump Company of Minneapolis, Minn.

Figure 6:
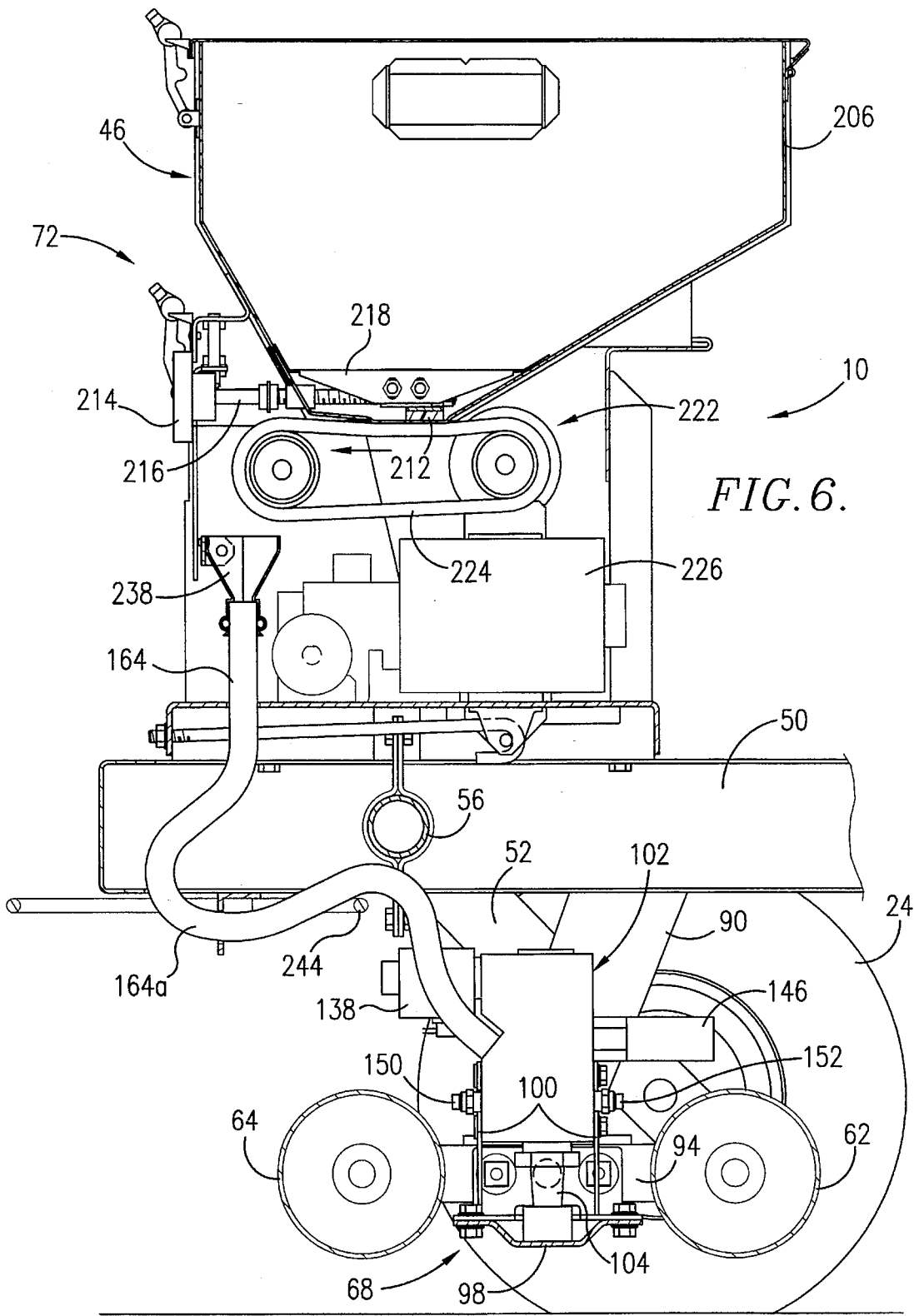
FIG. 6 is a vertical cross sectional view of the machine taken substantially along line 6—6 of FIG. 5.
Figure 7:
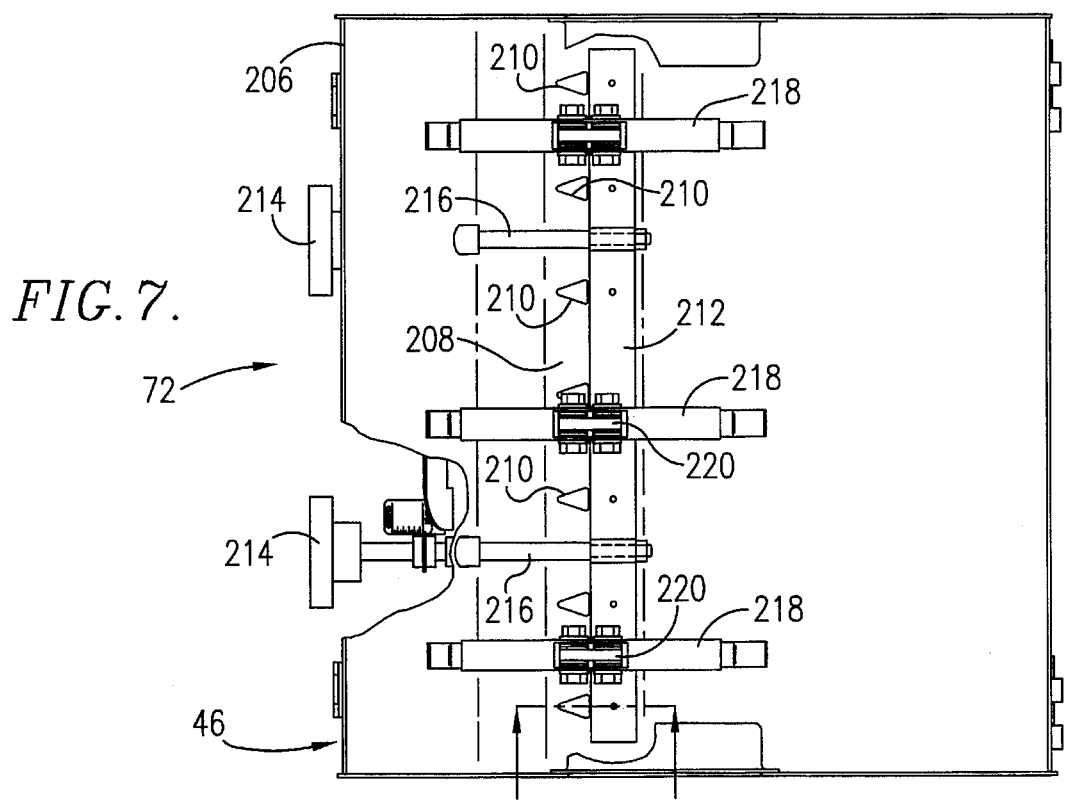
FIG. 7 is an enlarged, top plan view of the granular dry material hopper with the cover removed to reveal the dispensing orifices at the bottom of the hopper.
Figure 8:
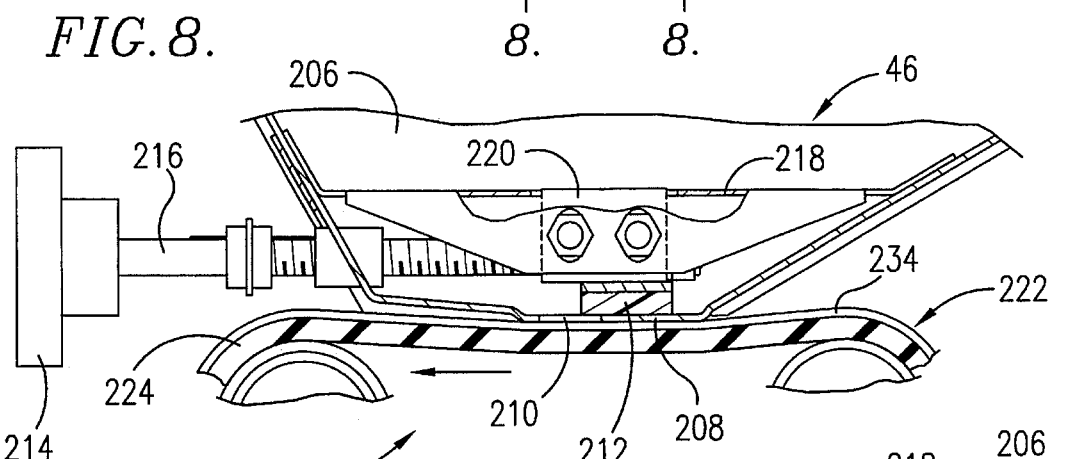
FIG. 8 is a further enlarged, fragmentary cross sectional view of the dispensing orifice area of the granular hopper showing in the interaction between the metering conveyor and the orifices at that location.

The additive supply system 72 is shown in detail in FIGS. 4–10. As illustrated in FIG. 6, for example, the additive supply system 72 includes a hopper 206 adapted to receive a supply of granular material to be injected. The flat bottom 208 of the hopper 206 has a transverse row of triangular outlet orifices 210 which allow the granular material to gravitate from the hopper 206 when a bar-like gate 212 uncovers the orifices 210 either partially or completely. The orifices 210 correspond in number to the discharge cones 104. In the illustrated embodiment there are seven discharge cones 104 and seven outlet orifices 210. The apexes of the orifices 210 point toward the front of the machine, and the gate 212 can be adjusted from a position completely uncovering the orifices 210 as illustrated in FIG. 7 to a position partially closing the same as illustrated in FIG. 8 or even completely closing the same (not shown). By virtue of the triangular shape of the orifices 210, the amount of material allowed to flow through the orifices 210 can be closely controlled.

Adjustable shifting of the gate 212 is accomplished manually through a pair of knobs 214 that are fixed to the forward ends of adjusting screws 216 coupled with the gate 212. Three overhead hold down units 218 span the front and rear walls of the hopper 206 a short distance above the bottom 208 and include slide blocks 220 of Nylon or other suitable material which bear down against the gate 212 to hold it firmly against the bottom 208 of the hopper in all positions of adjustment of the gate 212.

The additive supply system 72 also includes metering mechanism for continuously metering granular materials from the hopper 206 to a temporary collecting area. Such metering mechanism includes a special metering conveyor 222 having as its primary components a wide, endless, generally flat belt 224, a standard, electrically driven, d.c. motor 226, and a drive chain 228 (FIG. 3) entrained around sprockets 230 and 232 associated with the motor 226 and the belt 224 respectively. As will be described in detail hereinafter in connection with the control system 74, the motor 226 may be driven at variable speeds in relation to the distance traversed by the machine along its path of travel.

Figure 9:
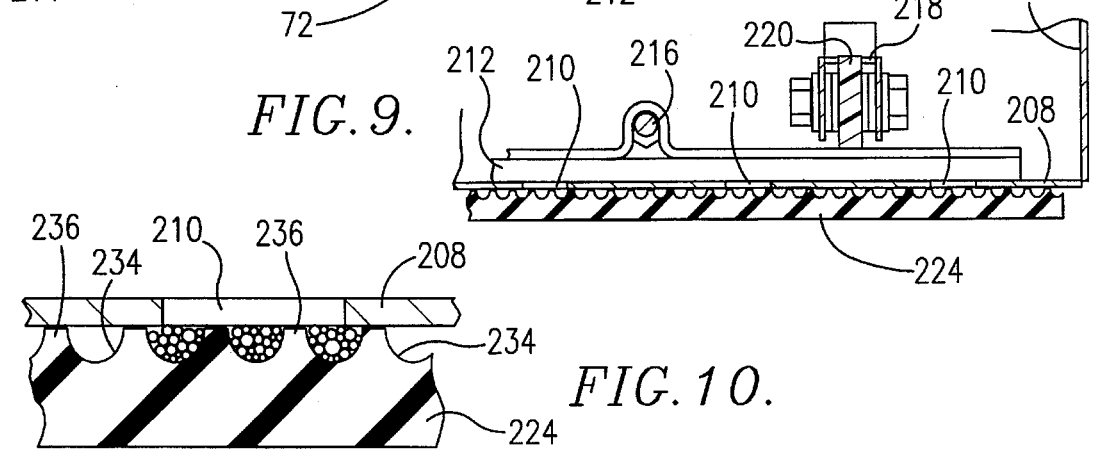
FIG. 9 is a fragmentary, transverse cross-sectional view through the dispensing orifices and illustrating the grooved nature of the metering belt of the metering conveyor.
Figure 10:
FIG. 10 is a further enlarged detail view of the wiping engagement of the ribs of the metering belt with the discharge orifices of the granular hopper and illustrating the manner in which the grooves become filled with granular material from the orifices.

As illustrated in particular in FIGS. 8, 9 and 10, the belt 224 along its top run engages and wipes against the bottom 208 of the hopper 206. Such engagement of the belt 224 with the bottom of the hopper causes the belt 224 to cover the orifices 210 so as to effectively operate as a valve for the orifices. While a perfectly flat top surface of the belt 224 would thus prevent materials from gravitating through the orifices 210 regardless of whether the belt 224 was moving or stationary, the belt is provided with a series of linearly extending, side-by-side grooves 234 and ribs 236 as shown most clearly in FIGS. 9 and 10. Thus, the grooves 234 provide recesses or cavities which can receive gravitating granular material from the orifices 210 even though the ribs 236 are in wiping engagement with the bottom of the hopper. Of course, when the belt 224 is stopped and the grooves 234 have become filled, no additional materials can gravitate through the orifices 210.

Depending upon the granule size of the dry material being dispensed, it may not be possible to have the belt 224 actually contact the bottom of the dispenser. If the particle size is large, it will be necessary to maintain a small space between the belt and the dispenser in order to provide room for the particles to accumulate in the grooves and to clear the bottom of the dispenser as the belt moves along. This space should be maintained as small as possible under the circumstances, i.e., large enough to assure that the material can gravitationally discharge from the dispenser and be carried away by the belt, yet small enough to assure that the material does not continue pouring out of the dispenser when the belt is stopped.

The "pitch" of the grooves, that is the spacing between adjacent grooves, is such that at the wide end of each of the orifices 210 the granular materials can fall into three of the grooves 234, as illustrated in FIG. 10. Preferably, the grooves 234 comprise one continuous helical spiral in the outer surface of the belt 224 from one lateral edge to the opposite lateral edge thereof. This causes the ribs 236 to move with a slight lateral motion or displacement as they pass beneath and wipe against the bottom 208 of the hopper, thus helping to wipe the orifices 210 free of any clinging loose particles.

The additive supply system 72 further includes a series of seven receiving funnels 238 that are situated below the discharge end of the conveyer metering belt 224 as illustrated in FIGS. 4, 5 and 6. The seven funnels 238 are clamped onto the upper ends of the seven corresponding additive supply hoses 164 which are connected at their lower ends with the inlet passages 162 of the injection head 68. As will be noted in FIGS. 6 and 12 in particular, each of the hoses 164 is supported in such a manner as to present a bight portion 164a to cause the presentation of an internal accumulating or collecting chamber 240 as illustrated in FIG. 12. Such collecting chamber 240 allows the accumulation of a new charge of material 242 during the pause between successive jets from the injection head 68. Preferably, a support member 244 as shown in FIG. 6 is utilized to create the generally U-shaped bight 164a in each hose 164.

FIG. 28 schematically illustrates various components of the control system 74, as well as the manner in which such components are connected with certain of the other components of the machine. One primary component of the control system 74 is the controller 246, which may comprise a suitable programmable computer. The controller 246 is housed within the control box 36 of FIGS. 1 and 2, where it receives inputs from various components of the machine and provides controlling outputs to various other operating components of the machine. As previously described, the solenoid 138 comprises part of the control system 74 and is energized and deenergized by the controller 246. In determining when to cause operation of the solenoid 138, the controller receives input signals from a distance sensor 248 associated with the drive wheel assembly 20 at the rear of the machine. In the illustrated embodiment, the distance sensor 248 takes the form of a perforated disc 250 which is driven by the hydraulic motor 30 and whose number of rotations are detected by a magnetic pickup 252 sensitive to the solid areas between perforations of the disc 250. The distance sensor 248 is preferably a standard magnetic pickup sensor that includes an enhanced or amplified pickup to reduce noise.

The input from the distance sensor 248 to the controller 246 is utilized by the controller 246 to regulate the speed of the electric motor 226 which drives the metering conveyor 222. Thus, there is a relationship between the speed of the metering conveyor motor 226 and the distance traversed by the machine along its path of travel as detected by the distance sensor 248. Although the speed of the machine along its path of travel is determined by the operator as he manipulates the handles 14, 16 to adjust the swash plate of the variable displacement pump 76, changes in the speed of the machine are calculated by the controller 246 and used to correspondingly change the speed of the metering conveyor motor 226.

Thus, for a selected concentration of additive for a certain surface area to be covered, the controller 246 will speed up or slow down the metering conveyor 222 as may be necessary in order to maintain that selected application rate in spite of increases or decreases in the speed of the machine. A four-position selector knob 254 on the control box 36 allows the operator to select any one of four different application rates, which will be automatically maintained by the control system 74. It should also be noted that the effective opening size of the hopper discharge orifices 210 can be adjusted by shifting the position of the gate 212 through the knobs 214. This will allow a higher or lower rate of granular discharge from the hopper 206 for all of the four available positions of the selector knob 254.

A three-position toggle switch 256 on the control box 36 provides an input to the controller 246 to either "calibrate" the machine, to run the machine on "automatic" or to manually "fire" the machine The machine is "calibrated" without connecting a water hose from the source of supply to the machine. In the "calibrate" position of the toggle switch 256, the controller 246 is operable to operate the additive supply system 72 even though the low pressure sensing and control switch would normally not permit the additive supply system 72 to work due to the low water pressure situation. Thus, only granular material is discharged during this procedure. Conveniently, the hoses 164 may be pulled out of the manifold block 102 and their lower ends inserted into a suitable container to collect all of the granular material being discharged from the machine. The volume of material thus collected may then be measured by weight or by volume to compare that actual amount with the desired amount for a particular unit of ground surface area such as, for example, 100 square feet. Conveniently, the controller 246 may be programmed so that during the calibration mode, a total of nineteen revolutions of the distance sensor disc 250 will be achieved corresponding to a traversed distance of 100 square feet. By jacking up the rear end of the machine to lift the drive wheel 28 off the ground, the necessary revolutions of the wheel 28 and the sensor disc 250 can be achieved without any actual forward motion of the machine itself. If the amount of material obtained is incorrect according to the desired application rate per unit of ground area, the position of the gate 212 over the hopper orifices 210 may be changed, or the relative speed of the metering conveyor motor 226 appropriately adjusted by the knob 254.

When the toggle switch 256 is in the "automatic" position, the controller 246 is operable to automatically control the additive system 72 and the water supply system 70 to intermittently inject both water and additive material into the ground, assuming that the three-position rocker switch 204 has been placed in its "inject" position on the control box 36. If the rocker switch 304 is in the "clean out" position, only water will issue from the machine without additive, and if the rocker switch 204 is in the "off" position, no water or additive at all will issue from the machine, regardless of the position of the toggle switch 256.

The toggle switch 256 will hold itself in either the "calibrate" or the "automatic" position once either of such positions has been selected by the operator. However, the operator must manually hold the switch 256 in the third or "fire" position wherein the automatic mode of the controller 246 is overridden so that the operator controls the lengths of blast time from the machine. Whether or not any granular material will issue with the water jet blast depends upon the position of the rocker switch 204 at this time.

The control box 36 is also provided with a three-position selector switch 258 for allowing the operator to select any one of three different spacings between the slots formed in the ground by the jets from the moving machine. The switch 258 causes the controller 246 to maintain the selected spacing distance between the starting points of successive slots. For example, one choice is a spacing of 1.5 inches from the starting point of one slot to the starting point of the next slot, another choice is 3.0 inches between starting points, a third choice is 4.5 inches between starting points, and a fourth choice is 6.0 inches.

A depth selecting switch 260 is also provided on the control box 36 to provide an input to the controller 246. The depth selection switch 260 may be placed in one of several different positions which establish the duration of blast time from the machine. When the machine is stationary, the duration of blast time has a direct relationship with the depth of the hole formed in the soil, while when the machine is moving along its path of travel the duration of the blast affects not only the depth of the resulting slot but also the length of the slot. Thus, the "depth" selected by the switch 260 determines the total volume of the opening or slot produced in the soil by the jet when the machine is in motion.

The control box 36 also has a height switch 262 which is contained within the actuator box 60 on the schematic diagram in FIG. 28. The height switch 262 is a three-position rocker switch having an "off" position, a "lower" position, and a "raise" position. The height switch 262 is used by the operator to energize the actuator 60 for raising and lowering the front of the machine to engage or disengage pressing rollers 62, 64 from the ground.

Additionally, the control box 36 includes a "slow down" warning light 264, an "overspeed" warning light 266, a "low pressure" warning light 268, and a "power on" warning light 270. The controller 246 causes the "slow down" warning light 264 to flash in the event the operator is driving the machine at a speed approaching an "overspeed" condition. All of the components of the machine continue to function in their usual manner when the "slow down" warning light is illuminated. However, if the machine reaches an "overspeed" condition, the controller will immediately shut down the metering conveyor 222 and the discharge head 68 so that the head 68 stops firing until the overspeed condition is corrected. An audio alarm 272 on the control box 36 also audibly warns the operator when the overspeed condition is reached.

In FIG. 28 the diagram illustrates a main off and on switch 274 having three positions. In the off position (as illustrated) the entire machine is off. In a start position of the switch 274, the engine starter circuit 276 is energized to start the gasoline engine 40. In the third position, which is utilized once the gasoline engine 40 has commenced operating, the switch 274 closes a circuit to activate the control system 74 and the appropriate operational components of the water supply system and the additive supply system, depending upon the conditions selected by the controller 246 and its various input switches.

Operation

Broadly speaking, the machine 10 is operated by the operator grasping the speed control handles 14, 16 and walking along with the machine as it travels in a "forward" or "reverse" direction along a path of travel. The ground speed is determined by the position of the speed control handles 14, 16 in either a forward or reverse direction, i.e. the further forward the handles 14, 16 are swung, the greater the forward ground speed, while the further rearwardly the handles 14, 16 are swung, the greater the ground speed in a reverse direction. The position of the limit stops 84 and 86 may be adjusted by loosening and then re-tightening the appropriate knobs 85, 87, the forward limit 86 being set to provide slightly more than the "overspeed" condition in the forward direction and the rear limit 84 being set to provide slightly more than the "overspeed" condition in the rear direction.

Assuming that the operator has calibrated the machine to dispense a desired amount of additive material by making the appropriate selection with the additive selector switch 254, the desired spacing of the injection slots has been chosen by the spacing selector switch 258, the desired depth and size of the injector slots has been chosen by the selector switch 260, and the machine has been placed in the "automatic" mode with the toggle switch 256, the machine will intermittently fire jets of water and additive material into the ground as the machine moves along its path of travel. In the preferred embodiment, the machine fires seven jets simultaneously from the seven discharge cones 104, although that number may obviously be varied without departing from the principles of the present invention.

In carrying out the injections, the water and additive material first come into contact with one another within the mixing chamber 160 below each nozzle 158. As each nozzle 158 fires, its powerful jet of water rushing through the mixing chamber 160 induces a secondary air-stream within the corresponding additive hose 164, immediately drawing the minute, accumulated charge of material 242 (FIG. 12) into the mixing chamber 160 to be incorporated into the water jet. During the short pause between successive jets from each nozzle 158, enough material has continued to fall from the metering conveyor 222 and into the hoses 164 to accumulate a minute charge of material in the accumulating chamber 240 in preparation for the next blast from the nozzles 158. Although the exact size of the accumulated charge may of course vary depending upon the nature of the granular material and the adjustments to the machine, such accumulated charge may be on the order of 0.003 ounces of material.

The operator may stop the machine at any time by simply returning the speed and direction control handles 14, 16 to their neutral position. When this occurs, both the metering conveyor 222 and the injection head 68 stop operation, as commanded by the controller 246. Since no additional distance signals are inputted by the distance sensor 248 to the controller 246, the controller 246 does not allow the discharge head 68 to fire. It also halts further operation of the metering conveyor 222 until the machine starts moving again. During stoppage of the machine, incoming water simply passes over relief, being partly circulated back through the water pump 70 and partly through the cleaning nozzles 150, 152.

The machine may be reversed at any time without complications. Although in many instances the operator may simply wish to turn the machine around at the end of one pass and continue moving in a "forward" mode after the machine is turned around, he may also simply stop the machine and reverse the direction of travel, while at the same time steering the machine to one side of the previous path so as to avoid applying another pass of material. By simply pulling the handles 14, 16 back against the "reverse" limit 84, or close to such position, the machine will commence moving in the opposite direction with intermittent injections of water and material in the same manner as on the previous, forward pass.

Figure 27B:
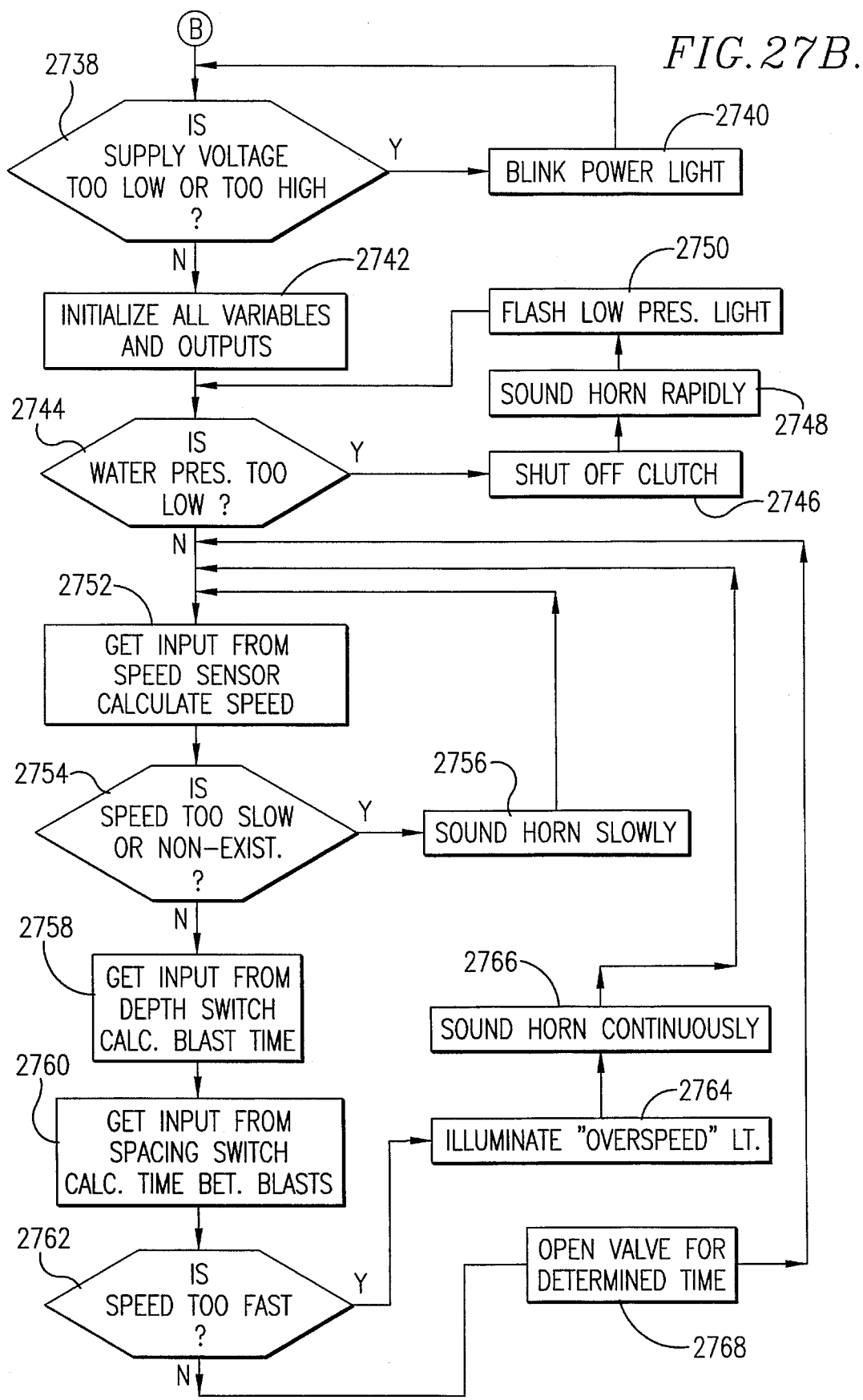
Figure 27C:
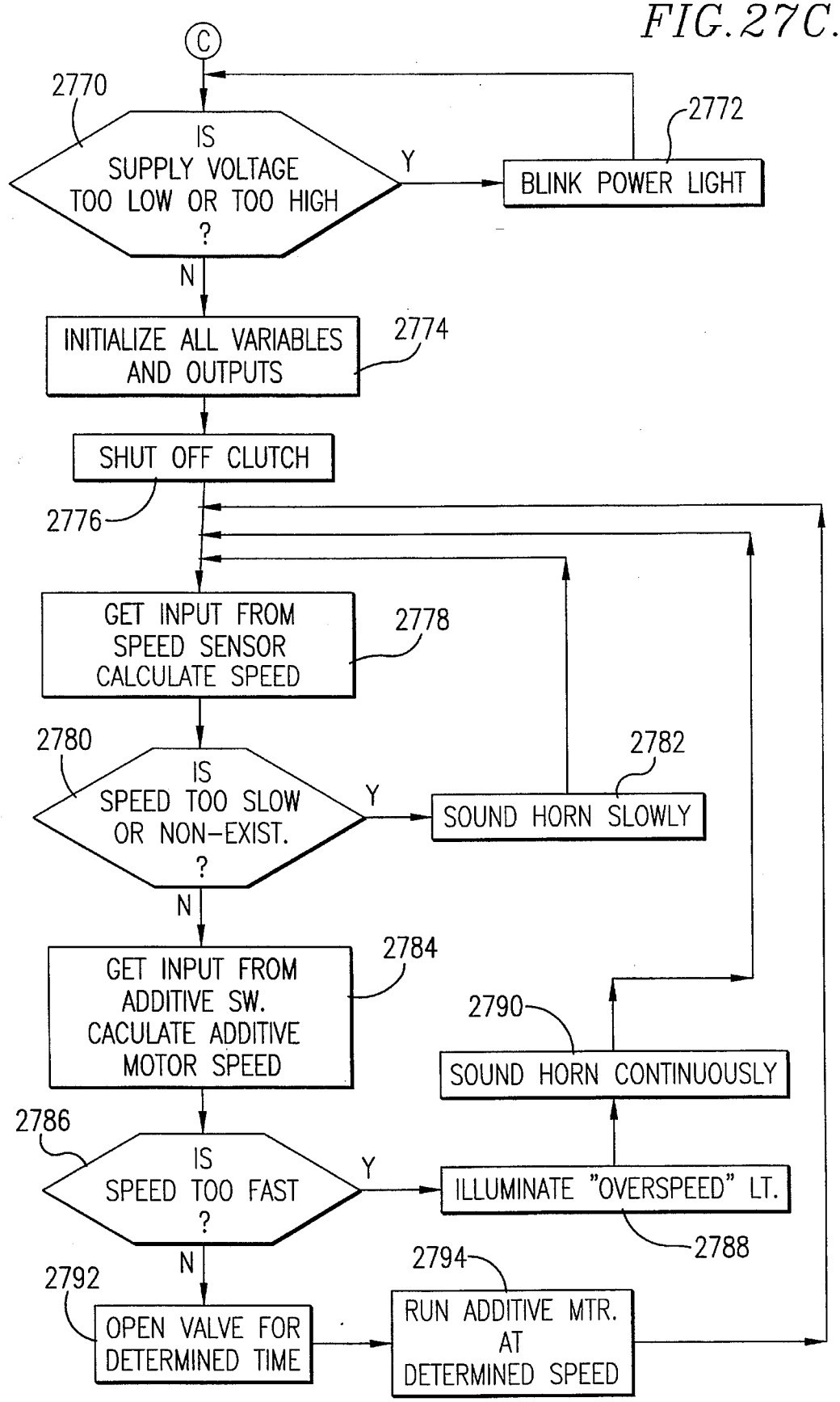

Referring to the flow chart of FIGS. 27, 27A1, 27A2, 27B and 27C, major steps in the operation of the controller 246 are illustrated. FIG. 27 illustrates that at start up of the machine, a decision must be made whether to have the three position toggle switch 256 set for "calibrate", "automatic", or "fire". If the toggle switch 256 is in the "fire" position, the machine will simply sit in a stationary condition as the nozzles continuously discharge their jets of liquid down into the ground. This might be used, for example, at the base of fruit trees in an orchard wherein it is desired to feed the root system of the trees.

If the toggle switch 256 is in the "automatic" position, then the further decision must be made of whether to place the rocker switch 204 in the "injection" position or the "clean out" position. If the rocker switch is in the "injection" position, then the controller proceeds through the sequence of steps illustrated in FIG. 27A1.

At step 2702 the controller checks to see if the supply voltage is too high or too low. If either of such conditions exists, the controller at step 2704 causes the power warning light 270 to start blinking, and the controller repeats this analysis until the operator takes appropriate remedial action.

If neither a high voltage or low voltage conditions exists, the controller proceeds to step 2706 to initialize all variables and outputs. Then, at step 2708, the controller checks to determine whether the water pressure is too low, using the low pressure switch 278. If it is too low, the controller disengages the clutch 202 at step 2710, then proceeds to sound the horn rapidly at step 2712, the low pressure warning light is flashed at step 2714, and the analysis is repeated. If the water pressure is not too low, the controller proceeds at step 2716 to obtain input from the speed sensor 248 and to calculate the speed of movement of the machine along the application path of travel.

Once the controller has the input from the speed sensor, the controller at step 2718 checks to determine whether the ground speed is too slow or non-existent. If either of those conditions exists, the controller at step 2720 causes the horn to sound slowly, and the analysis is repeated. If the speed is not too slow, the controller proceeds to step 2722 to obtain input from the depth switch 260 so as to calculate the blast time. Then the controller at step 2724 gets an input from the spacing switch 258 to calculate the time between blasts, as well as an input at step 2726 from the additive switch 254 to calculate the additive motor speed.

With these inputs in hand, the controller decides at step 2728 whether the ground speed at which the operator is moving the machine is too fast to achieve the depth, spacing and additive functions inputted at steps 2722, 2724 and 2726. If the ground speed is too fast, the controller at step 2730 causes the overspeed light 266 to illuminate and at step 2732, the horn 272 to sound continuously. The analysis is then repeated with inputs received from the speed sensor, depth spacing switch and additive switch.

If the ground speed is not too fast, the controller proceeds at step 2734 to open the solenoid valve 138 for the selected period of time and at step 2736, to run the additive motor at the speed appropriate for the determined ground speed. Thereafter, the controller loops back to step 2716 and obtains another input from the speed sensor.

Referring back to FIG. 27, if the rocker switch 204 is placed in the "clean out" position when the "automatic" mode has been selected with the toggle switch 256, the controller progresses through the series of steps illustrated in FIG. 27B. Basically, the series of steps through this routine is similar to that for the "injection" position of rocker switch 204, except that no additive is fired through the nozzles. Thus, at step 2738 the controller checks to see if the supply voltage is too low or too high, and if either of such conditions exists, blinks the power light at step 2740 to alert the operator to the problem. If the supply voltage is at the appropriate level, the controller proceeds to step 2742 where it initializes all variables and outputs. At step 2744 the controller checks to see if the water pressure is too low, and if it is, the clutch is disengaged at step 2746, the horn is sounded rapidly at 2748, and the low pressure warning light is flashed at step 2750.

If the water pressure is sufficiently high, the controller obtains an input from the speed sensor and calculates the ground speed at step 2752, followed by a determination at step 2754 of whether the detected speed is either too slow or is non-existent. If either of those conditions exists, the controller at step 2756 sounds the horn slowly until the speed condition is remedied. Thereupon, the controller at step 2758 obtains an input from the depth switch and calculates blast time, gets and input from the spacing switch at step 2760 and calculates the time between blasts, and then checks at step 2762 to determine whether the operator is running the machine at an excessive ground speed considering the parameters selected for depth and spacing.

If the ground speed is too fast, the controller illuminates the over speed light at step 2764 and also sounds the horn continuously at step 2766 to alert the operator to the problem. On the other hand, if the speed is not too fast, the controller at step 2768 opens the solenoid valve for the appropriate period of time to cause a water blast to issue from each of the nozzles.

Referring again to FIG. 27, if the "calibrate" position has been selected for toggle switch 256, the computer proceeds to the steps illustrated in FIG. 27C. Basically, the steps in this routine are similar to those in FIG. 27A1, except that the water supply has been disconnected from the machine so that no water flows through the system. Although the ground drive wheel is operated at this time, the wheel is jacked up off the ground so that there is no actual movement of the machine along the path of application.

At step 2770 the controller checks to determine if the voltage is too high or too low, and if either of such conditions exists, blinks the power light at step 2772 to alert the operator. If the supply voltage is satisfactory, the controller initializes all variables at step 2774 and then proceeds to shut off the clutch at 2776 since there will be no water delivered to the machine.

At step 2778, the controller gets an input from the speed sensor at the drive wheel and calculates the simulated ground speed. At step 2780 the controller determines whether the speed is too slow or is non-existent, and if either of such conditions obtains, the controller at step 2782 sounds the horn slowly and continues to do so until the speed falls within the acceptable range. Once the speed is in the acceptable range, the controller at step 2784 gets an input from the additive switch and calculates the additive motor speed, followed by the decision at step 2786 of whether the simulated ground speed is too fast for the additive motor speed. If the simulated ground speed is too fast, the controller at step 2788 illuminates the over speed light and at step 2790 causes the horn to sound continuously, until the speed falls into an acceptable range. Once the acceptable level for the speed is obtained, the solenoid valve 2792 is opened and the additive motor is run at the appropriate speed at step 2794. The total amount of additive thus obtained in the calibrate cycle over a known number of revolutions of the ground drive wheel can then be compared with the desired application rate since the revolutions of the ground wheel are directly related to the amount of surface area covered by the machine as it moves along the application path. The speed of the metering conveyor can then be adjusted appropriately by the four position additive switch 254, and the size of the discharge orifices can be adjusted in the bottom of the hopper, if desired.

In one exemplary embodiment of the present invention, a machine constructed in accordance with the principles of the present invention and capable of carrying out our inventive method was constructed in accordance with the following specifications. A total of seven discharge cones 104 were provided on the injection head 68 at a transverse spacing of 3 inches from center-to-center, yielding a total effective pattern width of 21 inches. The front end of the machine could be lowered by the actuator 60 to such a point that, in the operating mode, the lower tips of the discharge cones 104 were approximately ⅜ inch to ½ inch above the surface of the ground. Each high pressure nozzle 158 of the injection head 68 had a circular discharge orifice of 0.069 inches so as to produce a "solid" cylindrical water jet of approximately 0.069 inches in diameter. Considering the movement of the machine along its path of travel, the slot length produced by such jets ranged from 0.069 inches to a maximum of between 0.40 and 0.75 inches. The duration of each blast ranged from 0.05 seconds to 0.12 seconds. The spacing between the start of successive blasts could be adjusted between selections of 1.0 inches, 3.0 inches, 4.5 inches and 6.0 inches. The ground speed of the machine ranged from 0 to 3.5 miles per hour at transport speed. Typically, the machine was operated at approximately 0.75 miles per hour during the injection cycle. The operating pressure of the water supply system was preferably from 2,000 psi to 3,000 psi. An exemplary application rate of pesticide was 2 lbs. to 4 lbs. per 1,000 square feet, which results in each charge 242 in the collecting chamber 240 having a weight of approximately 0.003 ounces. The water pump 198 would provide approximately 4½ gallons of water per minute at 3400 rpm of its input shaft 78. Depending upon the ground speed of the machine, the depth of penetration of each slot could range from 7 to 8 inches when the machine was stationary to somewhat less than 1 inch at maximum ground speed.

The method and machine as thus described provide a way of successfully placing granular materials into the ground without mechanically penetrating the soil with a tool of some type. The water jets which carry the material into the soil leave no eruption on the surface to interfere with immediately following activities or other treatments. This can be particularly beneficial where the particles are being added to lawns, putting greens on golf courses and the like.

Furthermore, it will be appreciated that the metering problems associated with prior efforts to accurately and precisely inject granular materials have been overcome by the present invention. The metering system of the present invention does not use a gate or valve that opens and closes during each shot to control the amount of material dispensed to the nozzle. Prior efforts to control the application rate by varying the speed with which the valve opens and closes or the extent to which it opens and closes have been largely unsuccessful.

Instead of such an arrangement, the present invention eliminates the shuttle valve concept and relies instead upon the concept of feeding a steady stream of additive material to the region in which small charges of the material are accumulated in preparation for the water blasts. The size of each charge is determined by the speed of the conveyor bringing the material to the collecting chamber, which speed can be quite accurately controlled by a commonly available programmable computer. Thus, the application rate over any given amount of surface area can be varied by simply adjusting the delivery speed of the conveyor. By using the belt of the conveyor as a means for sealing the discharge outlet of a dry material hopper, the hopper can be allowed to discharge its contents in accordance with the speed of travel of the belt, which eliminates the need for other valving and simplifies the control procedure.

The present invention also provides a way of more accurately achieving the application rate selected for the particular job at hand. Instead of setting the nozzles to fire at certain time intervals and similarly controlling the metering of dry materials to the nozzles, the present invention fires its nozzles as a function of the distance traversed by the machine along its path of travel. Thus, until the machine travels its pre-set distance, the next blast from the nozzles will not occur, regardless of whether the machine travels quickly or slowly over such distance. In other words, although the spacing between slots can be adjusted by the operator, once a selection is made, that spacing (from the beginning of one slot to the beginning of the next slot) does not change. By delivering the granular material to the nozzles at a known rate of delivery, measured in terms of units of material per distance traversed by the machine, the application rate can be carefully monitored and controlled. The controller of the present invention checks the speed and distance traversed by the machine and either speeds up or slows down the metering conveyor depending upon what is necessary to have the right amount of material on hand when the nozzle fires again.

Liquid Additive Embodiment

FIGS. 24, 25 and 26 schematically illustrate a variation of the injection machine 10 of FIGS. 1–23. In FIGS. 24, 25 and 26 a supply system 572 for liquid additive material is illustrated in combination with the discharge head 68. It is to be noted that although a different additive supply system is necessary where the additive is liquid rather than dry, the discharge head 68 may remain completely unchanged.

With this in mind, it will be noted that the liquid additive supply system 572 includes a liquid container 574. Liquid is drawn from the container 574 by a suitable metering pump 576 as well understood by those skilled in this art. An inlet hose 578 leads from the bottom of the container 574 to the metering pump 576, while an outlet hose 580 leads from the pump 576 to a distribution manifold 582.

As illustrated in FIG. 26, the distribution manifold 582 has a single, central inlet passage 584 to which the hose 580 is connected. A longitudinal distributing bore 586 runs along the length of the manifold 582 and receives liquid from the inlet passage 584. A series of seven discharge nozzles 588 are connected with the distribution bore 586 and deliver pulses or increments of liquid into respective distribution hoses 590. As illustrated in FIG. 24, each of the hoses 590 is supported in a manner to produce a bight or bend so as to form an internal collecting chamber similar to the granular collecting chamber 240 of the first embodiment. Thus, during each pulse or blast of the injection head 68, an accumulated increment of additive liquid is drawn into the injection head through each line 590 and discharged along with the water jet out the discharge cone 104.

It is believed that one type of pump 576 suitable for the described purposes is a standard peristaltic "tubing pump" available from the Barnant Company of Barrington, Ill. It is also believed that nozzles 588 may take the form of the high pressure injection nozzles 158 of the injection head 68 with approximately the same orifice size.

Although preferred forms of the invention have been described above, it is to be recognized that such disclosure is by way of illustration only, and should not be utilized in a limiting sense in interpreting the scope of the present invention. Obvious modification to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing form but outside the literal scope of the invention as set out in the following claims.

We claim:

1. In turf maintenance apparatus, the improvement comprising:

an injection head for directing periodic jets of liquid and additive into the ground as the apparatus is moving along a path of travel;

a liquid supply system for supplying pressurized liquid to the injection head;

an additive supply system for introducing additive to the liquid within the injection head; and a control system for causing said jets to discharge from the injection head at spaced intervals along said path of travel of the apparatus, said control system including a controller, a distance sensor operable to provide ground traversing distance information to the controller, and a valve operable by the controller to admit successive bursts of pressurized liquid into the injection head as a function of the distance information provided to the controller by said sensor, said additive supply system including a dispenser for the additive and a mechanism for metering the additive from the dispenser at a predetermined rate, said metering mechanism being operable to deliver additive to the nozzle at a variable rate of delivery, said controller being operably coupled with said metering mechanism for driving the metering mechanism at a rate that varies as a function of distance traversed by the apparatus.

2. In turf maintenance apparatus as claimed in claim 1, said additive supply system including a mechanism for delivering additive in granular form to the injection head.

3. In turf maintenance apparatus as claimed in claim 1,
said additive supply system including a mechanism for delivering additive in liquid form to the injection head.

4. In turf maintenance apparatus as claimed in claim 1,
said injection head including a liquid nozzle connected with said liquid supply system for producing a jet of liquid when pressurized liquid is supplied to the nozzle, an outlet for the liquid jet downstream from the nozzle, and a mixing region between the nozzle and the outlet,
said mixing region having an inlet connected with said additive supply system for admitting additive to the mixing region for combination with the liquid jet produced by the nozzle.

5. In turf maintenance apparatus as claimed in claim 4,
said discharge head having a venturi for creating negative pressure within the mixing region to draw additive through the inlet as the jet is discharged from the outlet.

6. In turf maintenance apparatus as claimed in claim 1,
said controller including means for selectively adjusting the distance interval between successive operations of the valve.

7. In turf maintenance apparatus as claimed in claim 6,
said controller further including means for selectively adjusting the duration of each operation of the valve.

8. In turf maintenance apparatus as claimed in claim 6,
said additive supply system further including a dispenser for granular additive material and a collecting chamber disposed to receive granular additive material from the metering mechanism and to accumulate successive charges thereof,
said injection head communicating with said collecting chamber and having means for drawing the accumulated charge of granular material into the liquid jet during each discharge from the injection head.

9. In turf maintenance apparatus as claimed in claim 8,
said metering mechanism being operable to deliver granular material to the collecting chamber at a variable rate of delivery,
said controller being operably coupled with said metering mechanism for driving the metering mechanism at a rate that varies in relation to distance traversed by the apparatus.

10. In turf maintenance apparatus as claimed in claim 1,
said apparatus further including a common support for said injection head, liquid supply system, additive supply system and control system and means for propelling said support along the path of travel,
said propelling means being operable to continue movement of the support along said path of travel during the time said jets are discharging from the injection head.

11. In turf maintenance apparatus, the improvement comprising:
an injection head for directing periodic jets of liquid and additive into the ground as the apparatus is moving along a path of travel;
a liquid supply system for supplying pressurized liquid to the injection head;
an additive supply system for introducing additive to the liquid within the injection head; and
a control system for causing said jets to discharge from the injection head at spaced intervals along said path of travel of the apparatus,
said control system including a controller, a distance sensor operable to provide ground traversing distance information to the controller, and a valve operable by the controller to admit successive bursts of pressurized liquid into the injection head as a function of the distance information provided to the controller by said sensor,
said controller including means for selectively adjusting the distance interval between successive operations of the valve,
said additive supply system including a dispenser for granular additive material, mechanism for metering the granular additive material from the dispenser at a predetermined rate, and a collecting chamber disposed to receive granular additive material from the metering mechanism and to accumulate successive charges thereof,
said injection head communicating with said collecting chamber and having means for drawing the accumulated charge of granular material into the liquid jet during each discharge from the injection head,
said metering mechanism being operable to deliver granular material to the collecting chamber at a variable rate of delivery,
said controller being operably coupled with said metering mechanism for driving the metering mechanism at a rate that varies in relation to distance traversed by the apparatus,
said dispenser having a discharge orifice,
said metering mechanism including a conveyor disposed to gravitationally receive granular material from the orifice and to transport the received granular material away from the orifice when the conveyor is operating, and to prevent gravitational discharge from the orifice when the conveyor is stopped.

12. In turf maintenance apparatus as claimed in claim 11,
said conveyor comprising an endless web having an upper surface disposed in sufficiently close proximity to the orifice, considering the granule size of the material being dispensed, to prevent significant flow of the material out of the dispenser when the conveyor is stopped,
said surface of the web having a series of alternate grooves and ribs extending at least generally parallel to the direction of travel of the web,
said grooves being disposed to receive and contain granular material therein.

13. In turf maintenance apparatus as claimed in claim 12,
said collecting chamber having an entrance thereto,
said conveyor being operable to deliver granular material to said entrance substantially continuously during intermittent discharges of jets from the injection head.

14. In turf maintenance apparatus as claimed in claim 13,
said conveyor including a drive motor for the web,
said drive motor having means operably associated therewith for selectively adjusting the speed of the web relative to distance traversed by the support between successive discharges of the injection head.

15. In turf maintenance apparatus as claimed in claim 14,
said injection head including a liquid nozzle connected with said liquid supply system for producing a jet of liquid when pressurized liquid is supplied to the nozzle, an outlet for the liquid jet downstream from the nozzle, and a mixing region between the nozzle and the outlet,
said mixing region having an inlet connected with said additive supply system for admitting additive to the region for combination with the liquid jet produced by the nozzle.

16. In turf maintenance apparatus as claimed in claim 15, said injection head having a venturi for creating negative pressure within the mixing region to draw additive through the inlet as the jet is discharged from the outlet.

17. In turf maintenance apparatus as claimed in claim 16, said apparatus further including a common support for said injection head, liquid supply system, additive supply system and control system and means for propelling said support along the path of travel, said propelling means being operable to continue movement of the support along said path of travel during the time said jets are discharging from the injection head.

18. In turf maintenance apparatus as claimed in claim 14, said apparatus further including a common support for said injection head, liquid supply system, additive supply system and control system and means for propelling said support along the path of travel, said propelling means being operable to continue movement of the support along said path of travel during the time said jets are discharging from the injection head.

19. In turf maintenance apparatus as claimed in claim 11, said dispenser further having a gate operably associated with said orifice for adjustably varying the effective size of the orifice.

20. In turf maintenance apparatus as claimed in claim 11, said discharge head including a liquid nozzle connected with said liquid supply system for producing a jet of liquid when pressurized liquid is supplied to the nozzle, an outlet for the liquid jet downstream from the nozzle, and a mixing region between the nozzle and the outlet, said mixing region having an inlet connected with said additive supply system for admitting additive to the mixing region for combination with the liquid jet produced by the nozzle.

21. In turf maintenance apparatus as claimed in claim 20, said injection head having a venturi for creating negative pressure within the mixing region to draw additive through the inlet as the jet is discharged from the outlet.

22. In turf maintenance apparatus, the improvement comprising:

an injection head for directing periodic jets of liquid and additive into the ground as the apparatus is moving along a path of travel;

a liquid supply system for supplying pressurized liquid to the injection head;

an additive supply system for introducing additive to the liquid within the injection head; and a control system for causing said jets to discharge from the injection head at spaced intervals along said path of travel of the apparatus, said injection head including a liquid nozzle connected with said liquid supply system for producing a jet of liquid when pressurized liquid is supplied to the nozzle, an outlet for the liquid jet downstream from the nozzle, and a mixing region between the nozzle and the outlet, said mixing region having an inlet connected with said additive supply system for admitting additive to the mixing region for combination with the liquid jet produced by the nozzle, said discharge head having a venturi for creating negative pressure within the mixing region to draw additive through the inlet as the jet is discharged from the outlet, said apparatus further including a common support for said injection head, liquid supply system, additive supply system and control system and means for propelling said support along the path of travel, said propelling means being operable to continue movement of the support along said path of travel during a time said liquid jets are discharging from the injection head, said control system including a controller, a distance sensor operable to provide ground traversing distance information to the controller, and a valve operable by the controller to admit successive bursts of pressurized liquid into the injection head as a function of the distance information provided to the controller by said sensor.

23. In turf maintenance apparatus, the improvement comprising:

a dispenser for dry granular material, said dispenser having an outlet orifice through which the material is discharged;

a variable speed metering conveyor beneath said orifice for receiving discharging material from the dispenser and transporting the material to a point of delivery, said conveyor being operable to stop the discharge of material from the dispenser when the conveyor is stopped and to permit discharge of material from the dispenser at a rate determined by the speed of the conveyor when the conveyor is moving along a path of travel; and a control system operably coupled with said conveyor for controlling the speed of the conveyor.

24. In turf maintenance apparatus as claimed in claim 23, said conveyor including an endless web having an upper surface disposed in sufficiently close proximity to said orifice, considering the granule size of the granular material being dispensed, to prevent significant flow from the dispenser when the conveyor is stopped, said surface of the web having a series of alternating grooves and ribs extending generally parallel to said path of travel of the conveyor, said grooves being disposed for receiving and containing granular material from the orifice as the grooves pass below the orifice.

25. In turf maintenance apparatus as claimed in claim 24; and an injection head for injecting a jet of liquid into the ground in combination with an amount of granular material at spaced intervals along the path of travel of the machine.

26. In turf maintenance apparatus as claimed in claim 25, said conveyor having a variable speed motor for driving the same, said control system being operable to regulate the speed of said motor of the conveyor in relation to the distance traversed by the machine along said path of travel.

27. In a method of injecting additive material into the ground, the improvement comprising:

producing successive jets of pressurized liquid;

directing successive jets of the liquid toward the ground at spaced intervals along a path of travel;

producing successive charges of additive material;

maintaining each charge of additive material isolated from the liquid until a corresponding jet has been produced; and introducing a charge of material into a jet as the jet is directed toward the ground, the intervals between successive jets being a function of the distance traversed along said path of travel, said step of producing successive charges of additive material including the step of adjusting the rate of production of the charges as a function of distance traversed along said path of travel.

28. In a method of injecting additive material into the ground as claimed in claim 27, said directing step including the step of producing a region of negative pressure in association with the liquid jet, said introducing step including drawing the charge of material into the liquid jet using the region of negative pressure.

29. In a method of injecting additive material into the ground as claimed in claim 28, said step of producing successive charges of additive material including the step of delivering the material in a steady stream to a collecting chamber while the jets are produced intermittently, said introducing step including drawing each charge out of the collecting chamber and into the jet.

30. In a method of injecting additive material into the ground as claimed in claim 29, said step of delivering material to the collecting chamber in a steady stream including the step of adjusting the rate of delivery to the collecting chamber as a function of the distance traversed along the path of travel.

31. In a method of injecting additive material into the ground as claimed in claim 30, said step of directing successive jets into the ground being carried out while the jets are in motion along the path of travel.

32. In a method of injecting additive material into the ground as claimed in claim 31; and the further step of adjusting the distance interval between successive jets along the path of travel.

33. In a method of injecting additive material into the ground as claimed in claim 32; and the further step of adjusting the duration of successive jets.

* * * * *